(12) United States Patent
Marien

(10) Patent No.: US 8,270,839 B2
(45) Date of Patent: Sep. 18, 2012

(54) METHOD AND AN APPARATUS TO CONVERT A LIGHT SIGNAL EMITTED BY A DISPLAY INTO DIGITAL SIGNALS

(75) Inventor: Dirk Marien, Ranst (BE)

(73) Assignee: Vasco Data Security, Inc., Oakbrook Terrace, IL (US)

( * ) Notice: Subject to any disclaimer, the term of this patent is extended or adjusted under 35 U.S.C. 154(b) by 889 days.

(21) Appl. No.: 12/334,117

(22) Filed: Dec. 12, 2008

(65) Prior Publication Data
US 2009/0232515 A1 Sep. 17, 2009

Related U.S. Application Data

(63) Continuation-in-part of application No. 12/046,118, filed on Mar. 11, 2008, and a continuation-in-part of application No. 12/111,125, filed on Apr. 28, 2008, now Pat. No. 7,990,292.

(51) Int. Cl.
*H04B 10/00* (2006.01)
(52) U.S. Cl. ......................................... 398/135; 398/137
(58) Field of Classification Search .................. 398/107, 398/108, 135, 137, 138, 151, 156
See application file for complete search history.

(56) References Cited

U.S. PATENT DOCUMENTS

| | | | |
|---|---|---|---|
| 4,412,230 A | 10/1983 | Goldberg | |
| 4,483,012 A | 11/1984 | Wei | |
| 4,599,489 A | 7/1986 | Cargile | |
| 4,609,777 A | 9/1986 | Cargile | |
| 4,819,267 A | 4/1989 | Cargile et al. | |
| 4,881,818 A | 11/1989 | Bustamante et al. | |
| 5,136,644 A * | 8/1992 | Audebert et al. | 380/251 |
| 5,432,851 A * | 7/1995 | Scheidt et al. | 713/184 |
| 5,548,433 A | 8/1996 | Smith | |
| 7,307,569 B2 | 12/2007 | Vrazel et al. | |
| 2005/0030305 A1 | 2/2005 | Brown et al. | |

FOREIGN PATENT DOCUMENTS

| | | |
|---|---|---|
| EP | 1 211 841 B1 | 6/2002 |
| EP | 1 788 509 A1 | 5/2007 |
| EP | 1788509 A1 * | 5/2007 |

* cited by examiner

*Primary Examiner* — Dalzid Singh
(74) *Attorney, Agent, or Firm* — RatnerPrestia

(57) ABSTRACT

The present invention provides a method and a device to convert a time varying optical pattern emitted by a display into a digital data signal. More specifically the invention allows a handheld security token to convert a time-varying light intensity pattern emitted by a source such as a computer screen into a digital signal including a sequence of coded data symbols. The invention is based on the insight that the intensity of light emitted by regions of said source can be easily sampled by a simple low-cost processor if appropriate A/D conversion hardware converts the incident light into an electrical signal which is time varying, whereby the base frequency of this electrical signal is a function of the light intensity. Intensity levels used for channel coding and symbol clock can be recovered from the signal by the receiver. The invention comprises measuring this electrical signal, transforming sets of measurements into intensity samples for a plurality of sampling windows, adaptively calculating discrete intensity levels from these intensity samples, assigning intensity levels to the sampling windows, detecting symbol period boundaries, and decoding the symbols.

28 Claims, 13 Drawing Sheets

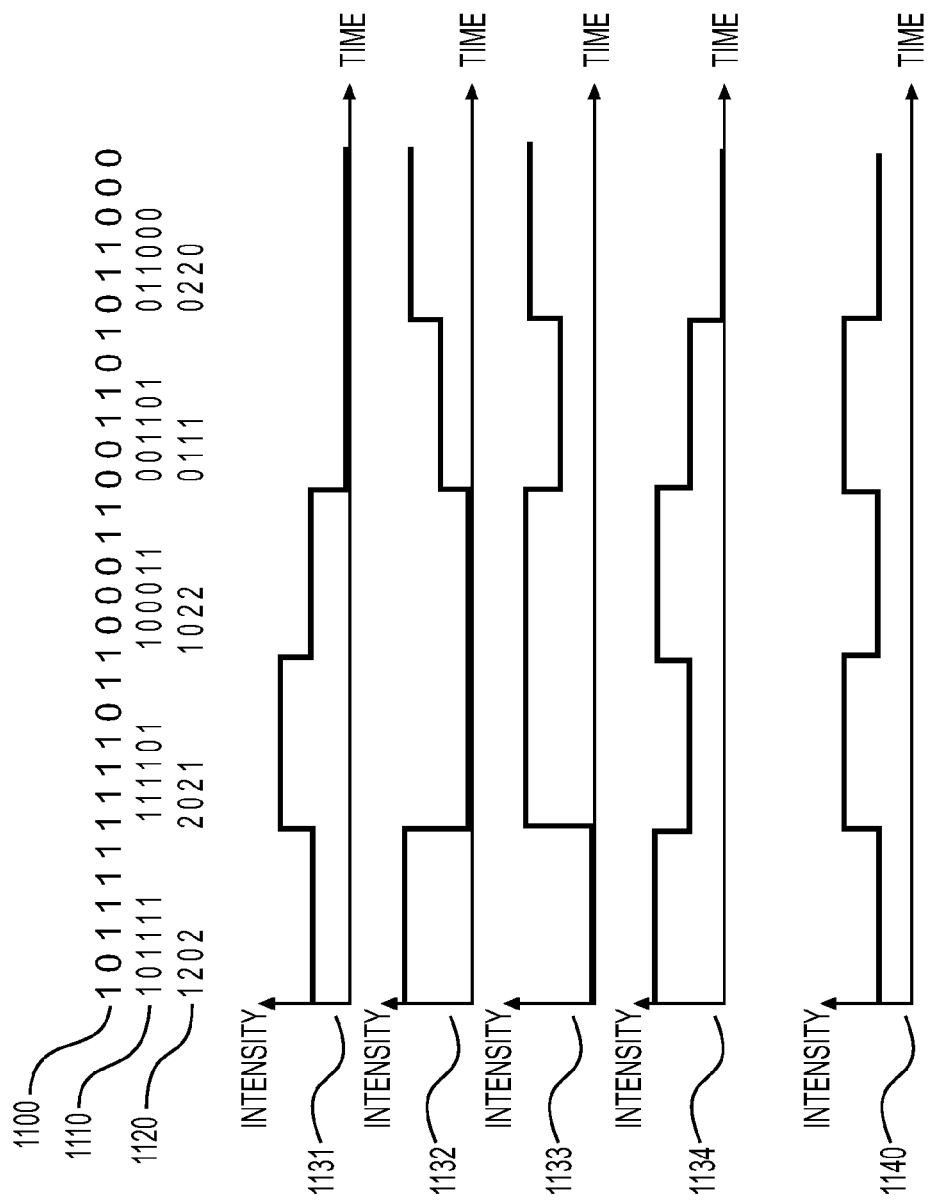

METHOD AND AN APPARATUS TO CONVERT A LIGHT SIGNAL EMITTED BY A DISPLAY INTO DIGITAL SIGNALS

RELATED APPLICATION

This application claims the benefit of the priority date of U.S. patent application Ser. No. 12/046,118 of Mar. 11, 2008 and of U.S. patent application Ser. No. 12/111,125 of Apr. 28, 2008 the entirety of which is incorporated by this reference.

TECHNICAL FIELD

The invention relates to a method and a device to convert digital data into a time varying optical pattern emitted by a display and then convert the optical pattern into a digital signal. More specifically the invention relates to a handheld security token converting time-varying light intensity patterns emitted by a display such as a computer screen into a digital signal consisting of a sequence of coded data symbols.

BACKGROUND ART

As remote access of computer systems and applications grows in popularity, the number and variety of transactions which are accessed remotely over public networks such as the Internet has increased dramatically. This popularity has underlined a need for security; in particular: how to ensure that people who are remotely accessing an application are who they claim they are, how to ensure that transactions being conducted remotely are initiated by legitimate individuals, and how to ensure that transaction data has not been altered before being received at an application server.

One technology for authentication and transaction signature capabilities is offered by 'strong authentication token devices'. Typical examples of strong authentication tokens are the products of the DIGIPASS® line, commercialized by Vasco Data Security Inc. (see the website http://www.vasco.com). A strong authentication token is an autonomous battery-powered device, dedicated to providing authentication and transaction signature functions, usually pocket-size, with its own display and keypad. The main purpose of a strong authentication token is to generate dynamic security values which are usually referred to as 'One-Time Passwords' (OTPs).

Typically these OTPs are generated by cryptographically combining a secret that is shared between the token and a verification server with a dynamic value such as a time value, a counter value or a server challenge that is provided to the token, or a combination of these. Some strong authentication tokens can also use data (such as transaction data) that have been provided to the token as dynamic value or in combination with any of the dynamic values mentioned above to generate a security value.

A typical way to provide data to a strong authentication token is by letting the user enter the data manually on the token's keypad. When the amount of data that has to be entered in this way exceeds a few dozen characters, the process is often perceived by users as too cumbersome. To relieve the user, solutions have been devised whereby the input of data doesn't require the manual entry of said data by the user on the token's keypad.

One such solution consists of tokens that allow for data input by means of an optical interface, whereby the user holds the token close to an optical source such as a computer screen that displays a varying optical pattern. Examples of such optical tokens are the Digipass 700 token and the Digipass 300 token, both offered by Vasco Data Security Inc., and the tokens described in EP 1211841 May 6, 2002, EP 1788509 May 23, 2007, U.S. Pat. No. 5,136,644 Apr. 8, 1992.

These tokens are typically used to secure applications such as internet banking. As a consequence they are used by a large number of bank customers with a very broad range of computer screen qualities and environmental lighting conditions and a variety of computer platforms. It also means that, in spite of these heterogeneous operational conditions, these tokens are expected to work very reliably. The tokens must also be convenient to work with i.e. be tolerant on the way they are being handled, offer an acceptable data throughput and allow for independence of the users with respect to access point. Last but not least, because of the high number of users, the tokens are also supposed to be very cost-effective.

Designing tokens that satisfy all these conditions is a significant challenge. The technical problems to be surmounted include:

The great variety in absolute intensity levels of the emitted light among different screens especially between Liquid Crystal Display (LCD) and Cathode Ray Tube (CRT) screens. This means that there is a large dynamic range in the emitted light intensity.

The great variety in relative differences between the different light intensity levels used due to background offsets. The combination of environmental light and the effect of backlit LCD displays means that the contrast between the measured High and Low light intensity levels is often quite low, resulting in a large common mode and little margin for noise.

The completely different characteristics of the light emission pattern in function of the time for the different display technologies: while CRT displays are characterised by discrete short intense pulses of light emission, LCD screens have a much more smooth and continuous emission characteristic. We define the instantaneous intensity of an optical signal emitted by a region of a display as the power of that signal at a particular moment of time, whereas we define the intrinsic intensity of the same optical signal as the average power of that signal over one refresh cycle of the display. With these definitions one can say that for LCD displays the instantaneous intensity of the signal is most of the time more or less constant during a refresh cycle and thus more or less equal to the intrinsic intensity, whereas for CRT displays the energy of the signal emitted during a refresh cycle is concentrated in a short spike such that the instantaneous intensity during most of the refresh cycle is very low and below the intrinsic intensity while it is significantly higher than the intrinsic intensity during the aforementioned short spike.

The relatively low refresh rates of displays. This gives a relatively low upper boundary on the maximum symbol rate.

Variety in refresh rates on different displays, aggravated by the fact that in practice it is difficult if not impossible for the software responsible for emitting the light pattern to figure out which is the actual physical refresh rate of the screen being used. This means that no synchronization between symbol rate and refresh rate can be guaranteed. As a consequence the number of display refresh cycles per symbol clock period can not be assumed to be a constant integer, which in turn means that the total amount of light emitted in one symbol clock period can vary drastically for the same intended light level.

The displays used by end-users and the conditions in which they are used can change in time and can do so frequently e.g. if a user switches regularly between a workstation with a CRT screen and a laptop with an LCD screen. Also, end-users can in general not be assumed to be technology-savvy nor can they in general be relied upon to faithfully and diligently execute complicated operational instructions. These factors exclude solutions which incorporate a user controlled configuration phase in which the user is expected to set some parameters, or an adaptation phase of any appreciable length in which the device tunes certain parameters itself.

What is therefore needed is a low-cost device that is capable of receiving in a relatively short amount of time a moderate amount of digital data optically emitted by a display that can be used in a reliable and user-convenient way in combination with a wide variety of displays and display types and in a wide variety of environmental conditions.

DISCLOSURE OF THE INVENTION

The present invention provides a method for modulating data onto a plurality of optical signals, comprising mapping said data onto sets of symbol values according to a channel coding alphabet, transmitting said sets of symbol values as a plurality of optical signals by displaying them as a plurality of regions with time-varying intensity, and fixing, in every symbol period, the intrinsic optical intensity amplitude of each of said optical signals to levels chosen from a discrete set of intensity levels as a function of the symbol value being transmitted.

The present invention also provides a method for retrieving digital data from a plurality of optical signals, in particular as described above.

The present invention furthermore provides an apparatus adapted to receive a plurality of optical signals, in particular as described above, and to retrieve digital data from said plurality of optical signals.

The present invention is based on the insight that the task of extracting the data transmitted by optical signals received from a display will be simplified if the sampling moments of said received optical signals always coincide with the moments of peak emission in case the emitting display uses CRT technology.

More particularly, the present invention is based on the insight that by using a symbol coding whereby during every symbol period at least one of the optical signals has an intrinsic optical intensity amplitude that is sufficiently higher than zero with reference to the typical intensity of noise sources such as ambient light, it is possible to:

ensure that on a CRT display the instantaneous light intensity during the CRT intensity spikes of said at least one of the optical signals will be detectably higher than the instantaneous light intensity of said at least one optical signal in between the CRT intensity spikes during said symbol period as well as exceed the instantaneous light intensity that would be present if no optical signal is being transmitted; and ensure that on a LCD display the instantaneous light intensity of said at least one of the optical signals will be detectably higher during the whole symbol period than the instantaneous light intensity in case no optical signal is being transmitted.

The present invention is also based on the insight that by choosing an appropriate threshold value and selecting those sets of substantially concurrent instantaneous optical signal intensity measurements where the instantaneous intensity measurement of at least one of said optical signals exceeds said threshold value, it is possible to process only instantaneous optical signal intensity measurements whose value is a function of both intrinsic amplitude and the signal phase (i.e. the moment of time of measuring the instantaneous intensity of the signal relative to the beginning of the display refresh cycle or, more specifically, relative to the centre of the CRT intensity spike in case of a CRT display) of the respective optical signals.

The present invention is further based on the insight that by dividing for each optical signal said selected instantaneous intensity measurements into groups comprising the measurements taken during the same CRT intensity spike, it is possible to calculate for each group from the measurements in said group a sampling value that is representative for the intrinsic optical intensity amplitude of said optical signal.

The present invention is furthermore based on the insight that by using, at the transmitter side, a symbol coding whereby at every change of symbol the intrinsic optical intensity amplitude of at least one of the optical signals changes, it is possible to divide, at the receiver side, said representative sampling values into symbols, each boundary of which can be derived from a transition in the detected intrinsic optical intensity amplitude between consecutive representative sampling values of at least one of said optical signals.

The present invention is still further based on the insight that by using a sampling method in which the sampling values are representative for the intrinsic optical intensity amplitude of the sampled optical signals regardless of the number of CRT spikes occurring in any single symbol period, it is possible to use a symbol rate that is close to but not necessarily synchronous to the display refresh rate.

The invention is also based on the insight that a solution will be more robust with respect to variability in displays and environmental conditions if the intensity reference levels used by the receiving device to decode the received optical signals are derived from the received signal and updated in an adaptive way.

More particularly, the invention is based on the insight that it is advantageous to use a symbol coding that allows the receiver to readily identify a number of key optical intensity amplitudes, without having to wait an indeterminate amount of time for these key amplitudes to occur in the incoming symbol stream. By using a symbol coding whereby all the members of a certain subset of the intrinsic optical intensity amplitudes that are used to code the symbol values transmitted by the optical signals are guaranteed to be used within a certain number of consecutive symbol periods starting from any symbol period, it is possible for the receiving device to adaptively determine from some of the representative sampling values at least some of the intensity reference levels that are used to decode the received optical signals.

The invention is further based on the insight that the lowest (and/or highest) intrinsic optical intensity amplitudes that are used in the optical signals to code the symbol values can be adaptively determined by using a dynamic peak detection method in which the reference values for said lowest (and/or highest) intrinsic optical intensity amplitudes are with time gradually relaxed to a less extreme value until a representative sampling value occurs which is lower (respectively higher) than the then-current reference values, at which time said representative sampling value is used to update said then-current reference values.

In one embodiment of the present invention one of the optical signals is used as a clock signal which is in phase with the optical signals used to transmit the data and which cycles through all coding levels used by said data signals except for the coding level having the lowest light intensity, thus allowing the receiving device to determine the phase transitions in the received optical signals as well as to adaptively determine and update the intensity reference levels to decode the received optical signals in a relatively simple and robust way.

An embodiment of the apparatus of the present invention provides a low-cost receiving apparatus by using a single processor to both analyze the received optical signals and to perform any other processing tasks in the device (such as interacting with the user), in combination with Analog-to-Digital (AD) conversion hardware built using a limited number of robust low cost components.

In a particular embodiment of the apparatus of the present invention the AD conversion hardware in the receiving device is built using a limited number of robust low cost components and the pattern of emitted light has an inherently low spatial resolution, e.g. the pattern comprises a small or modest number (e.g. five) of regions whose light intensity evolves separately in time. Preferably said regions in the pattern of emitted light can be easily located and aligned with the corresponding light sensitive sensors of the receiving device, and a low number of levels (e.g. three) to modulate the light intensity emitted by these regions is used. As a consequence the reception of data is more reliable and user-convenient.

In another particular embodiment of the invention said AD conversion hardware converts the incident light of an optical signal into a corresponding oscillating electrical signal whereby the oscillation frequency of this electrical signal is a measure of the light intensity. As a consequence the intensity of incident light emitted by said regions can be easily measured by said simple low-cost processor by measuring said frequency of said corresponding electrical signals.

In yet another particular embodiment of the invention said AD conversion hardware comprises at least one simple circuit comprising a capacitor and a light sensitive current source to charge or discharge this capacitor and one or more components to reset the charge of the capacitor once it has reached a certain threshold; said simple circuit adapted to convert a light intensity signal into a voltage signal with the characteristics described above.

In one embodiment of the invention one of the separate regions in the time varying pattern is dedicated to a clock signal which cycles in a regular way through some of the light levels used to modulate the light intensity of the separate regions, which allows comparing the measured intensities of the other regions used to code the data to be transmitted with the measured levels of the clock channel; the measured levels of the clock channel acting as reference levels, which enables the device to dynamically adapt to widely varying absolute values of light intensities, thus addressing the problem of the wide variety in characteristics of light sources and environmental conditions.

In a particular embodiment of the invention one or more of the coding levels is not used in the clock signal and an alternative method is used to determine the reference levels not used in the clock signal, which simplifies the processor's task to determine the reference levels in the clock signal.

In a more particular embodiment of the invention an intensity amplitude corresponding to the lowest or highest coding level is not used in the clock signal, and the reference level corresponding to said intensity amplitude is determined from the data signals using dynamic peak detection.

In yet another more particular embodiment one or more intensity amplitudes corresponding to intermediate coding levels are not used in the clock signal and are determined from the levels present in the clock signal using an interpolation algorithm.

The present invention thus advantageously provides a method to optically transmit data and a low-cost apparatus to receive said transmitted data in which:
the symbol rate can be close to the minimum refresh rate of the display, and
the data can be encoded using more than two light intensity levels, and
an adaptive AD conversion method is used that is robust and relatively independent of the environmental conditions and the display being used and that converges rapidly, so that only minimal time is needed for tuning the receiver to the display being used and the environmental conditions;
so that an acceptable data throughput is achieved in a wide variety of environmental conditions in combination with a wide variety of displays and display types.

BRIEF DESCRIPTION OF THE DRAWINGS

The foregoing and other features and advantages of the invention will be apparent from the following, more particular description of several embodiments of the invention, as illustrated in the accompanying drawings.

FIG. 11 illustrates a string of data in binary and ternary representation to be transmitted using a plurality of optical signals according to an embodiment of the present invention and shows how the intensity of these optical signals varies with time.

MODE(S) FOR CARRYING OUT THE INVENTION

Figure 1:
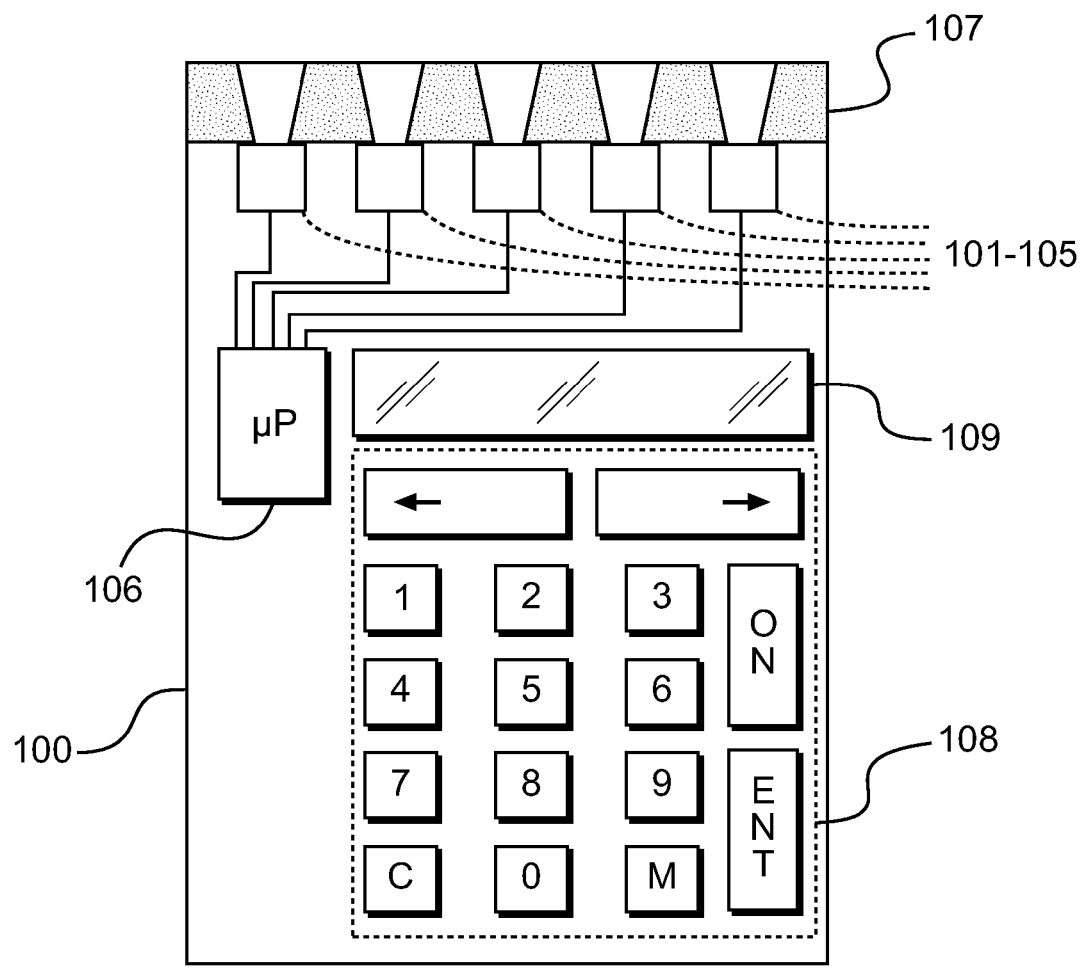
FIG. 1 shows an embodiment of the invention consisting of an optical strong authentication token.

FIG. 1 shows an embodiment of the invention. As shown in FIG. 1 the token 100 receives and processes optical signals. The token (100) comprising:
five optical channels (101-105) each consisting of a hardware circuit which includes an optically sensitive component;
a processor (106) connected to said optical channels (101-105) for processing the received signals and carrying out other processing tasks;

a bezel (107) in front of said optically sensitive components of said optical channels to shield the optical elements from stray light from the environment, to reduce crosstalk between the optical channels (101-105), and made of a relatively soft material to avoid risk of scratching the computer display; and a user interface including a keypad (108) and an LCD (109).

To capture input data represented by a time varying light pattern from a source such as a computer display, the user holds the token (100) against (or very close to) the computer display such that each opening in the token's bezel (107) (and the optically sensitive component (101-105) behind that opening) is correctly positioned in front of its corresponding area in the time varying light pattern.

When in receiving mode, the token continuously divides its processing time, on the one hand into analyzing the optical signals detected by the optical channels to extract a data signal and, on the other hand into other tasks such as handling user input and processing the received data. To extract a data signal from the detected optical signals, the token proceeds as follows:

For each optical channel, the token converts the intensity of the light incident on the optically sensitive component into a time-varying electrical signal.

The token regularly samples each time-varying electrical signal to obtain a series of numerical values for each optical channel, said values being indicative of the light intensities. The time-varying electrical signals of all optical channels are sampled substantially concurrently.

When the optical channels have thus been sampled, the token analyzes said series of numerical values to detect:
the symbol periods of the signal,
a symbol period to which the respective numerical values belong, and
the optical intensity reference levels being used at any one time to encode the digital signal.

The token assigns each numerical sample to a symbol period and maps the ensemble of the sample values of each optical channel within the same symbol period on one of the detected intensity reference levels, thus obtaining a clocked digital signal for each optical channel.

The token decodes said clocked digital signals to obtain a data signal.

Figure 2A:
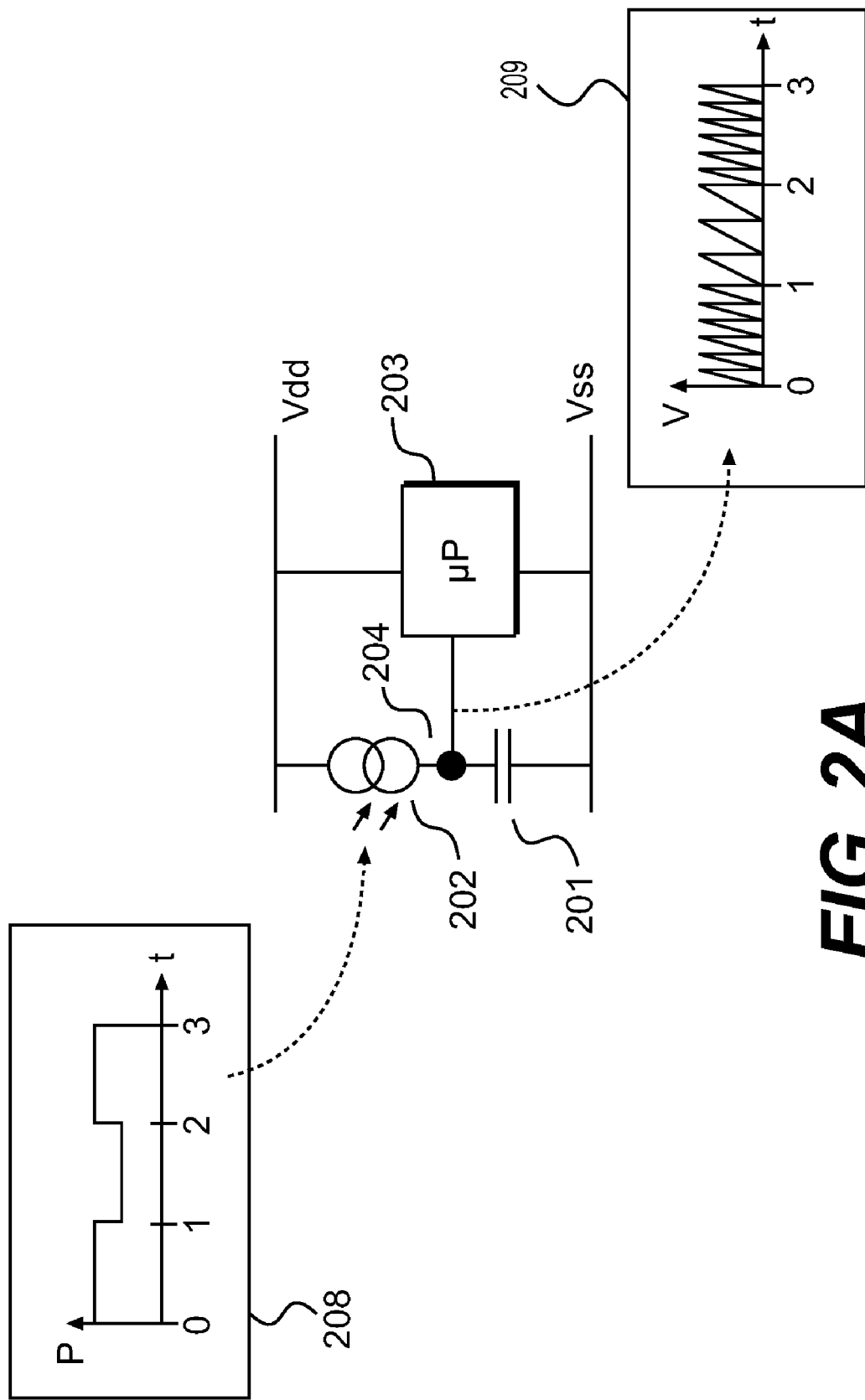
FIG. 2a illustrates a simple hardware scheme to convert a light intensity into a time varying electrical signal.

FIG. 2a shows a hardware circuit for converting the light intensity (208) falling on the photosensitive current source (202) into a time varying voltage (209) over capacitor (201). The photosensitive current source (202) may be implemented by means of a combination of a photosensitive transistor and a resistor in series. The capacitor (201) is connected to an input gate of microprocessor (203). The microprocessor (203) (actively or passively) monitors the input gate.

When the microprocessor (203) detects a high voltage, i.e. a logical "1", at the input gate, for example by regularly polling the input gate or by some interrupt mechanism, it does two things. On the one hand it increases a pulse counter, and on the other hand it discharges capacitor (201). Capacitor (201) will now be re-charged by the photosensitive current source (202). The time needed to re-charge capacitor (201) to the level which will be seen by the microprocessor (203) as a high voltage, is proportional to the current through the photosensitive current source (202) which in turn is determined by the incident light intensity (208). As a consequence, the pulse count per time unit is determined by the light intensity.

In a variation of this scheme, microprocessor (203) has a time counter, which it resets after copying its value upon detecting a high voltage at the input gate; additionally, it discharges capacitor (201) as described above. In a way analogous to the pulse counts described above, the copied values of the time counter will be determined by the incident light intensity.

Figure 2B:
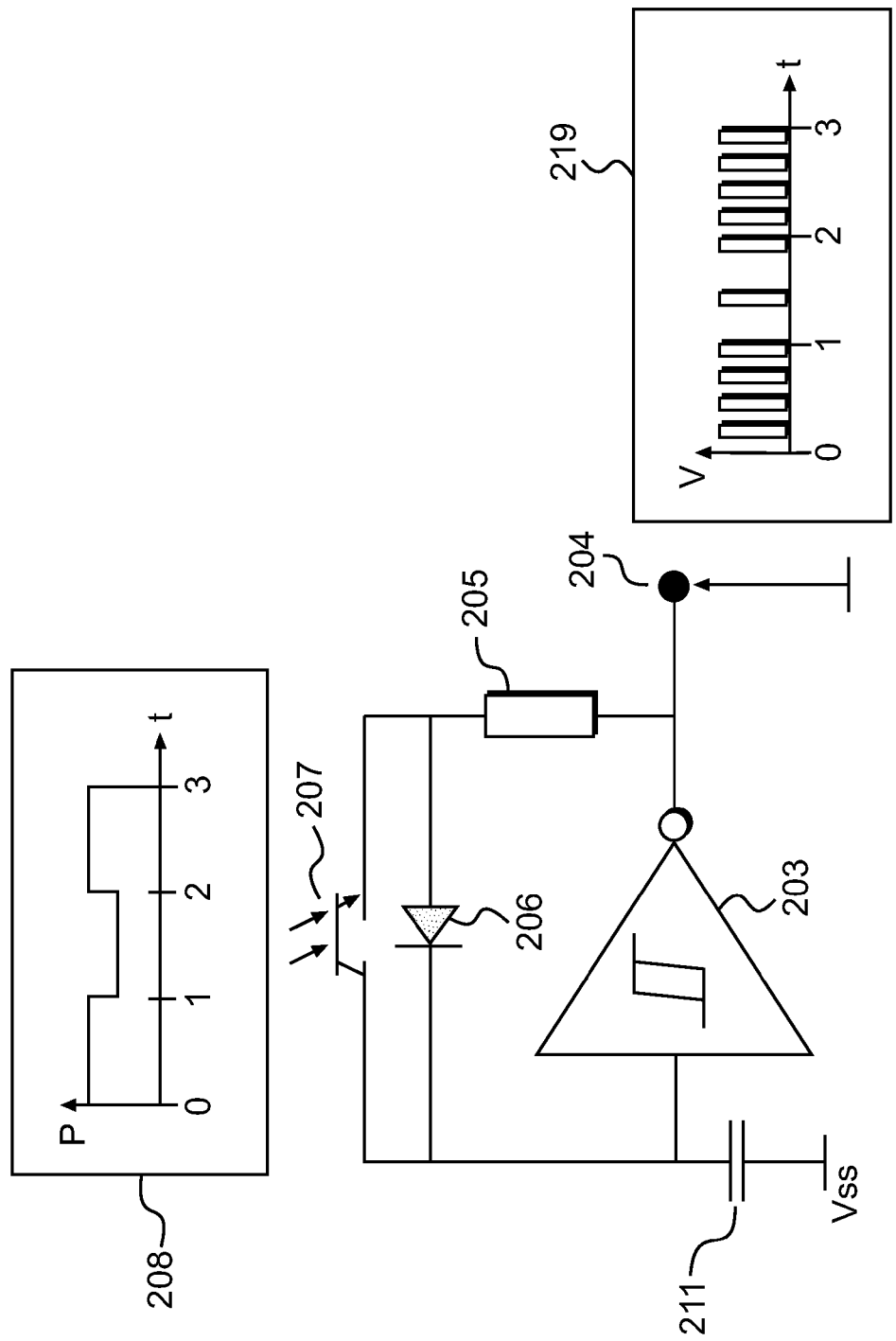
FIG. 2b illustrates an alternative hardware scheme to convert a light intensity into a time varying electrical signal.

FIG. 2b illustrates an alternative circuit to convert a time-varying optical signal (208) into a time-varying electrical signal (219). The circuit comprises an optical transistor (207), a diode (206), a resistor (205), a capacitor (211), and an inverting Schmitt-trigger (203). This circuit acts as an oscillator which oscillates between a high and a low voltage:

When the input of the inverting Schmitt-trigger (203) is low and the output (204) of the inverting Schmitt-trigger (203) is high, a current flows through resistor (205) and diode (206) while transistor (207) is not conducting. That current charges capacitor (211).

When the voltage over capacitor (211) reaches a certain threshold level $V_{high}$, the inverting Schmitt-trigger (203) switches its output (204) to low. Diode (206) is no longer conducting, but optical transistor (207) is now conducting, effectively acting as a current source, the level of current being approximately proportional to the intensity of the incident light (208). The current through transistor (207) discharges capacitor (211) again and when the voltage over capacitor (211) descends below a certain threshold level $V_{low}$, the inverting Schmitt-trigger (203) switches its output (204) to high again, thus completing one oscillation cycle.

The time to charge capacitor (211) to the threshold voltage $V_{high}$, (and hence the time that the output (204) of the inverting Schmitt-trigger (203) stays high), is essentially determined by the physical characteristics of resistor (205) and capacitor (211) and is therefore a constant of the circuit. The time to discharge capacitor (211) again to the threshold voltage $V_{low}$, (and hence the time that the output of the inverting Schmitt-trigger (203) stays low), is essentially determined by the physical characteristics of capacitor (211) and on the level of current of optical transistor (207) which in turn is determined by the physical characteristics of said transistor (207) and the intensity of the incident light (208) on said transistor. The oscillation period of said circuit is therefore determined by the physical characteristics of the circuit components and the intensity of the incident light (208).

A processor, connected to the output (204) of said circuit, measures the oscillation frequency of said circuit output. To measure the oscillation frequency, in one embodiment the processor frequently (i.e. more frequently than the highest expected oscillation frequency of said circuit) checks whether the output voltage of said circuit is high or low, and can thus count the number of oscillation pulses of said circuit. The number of counted time pulses per time unit is a measure of the incident light intensity; the relation between light intensity and pulse count being approximately linear.

Figure 3:
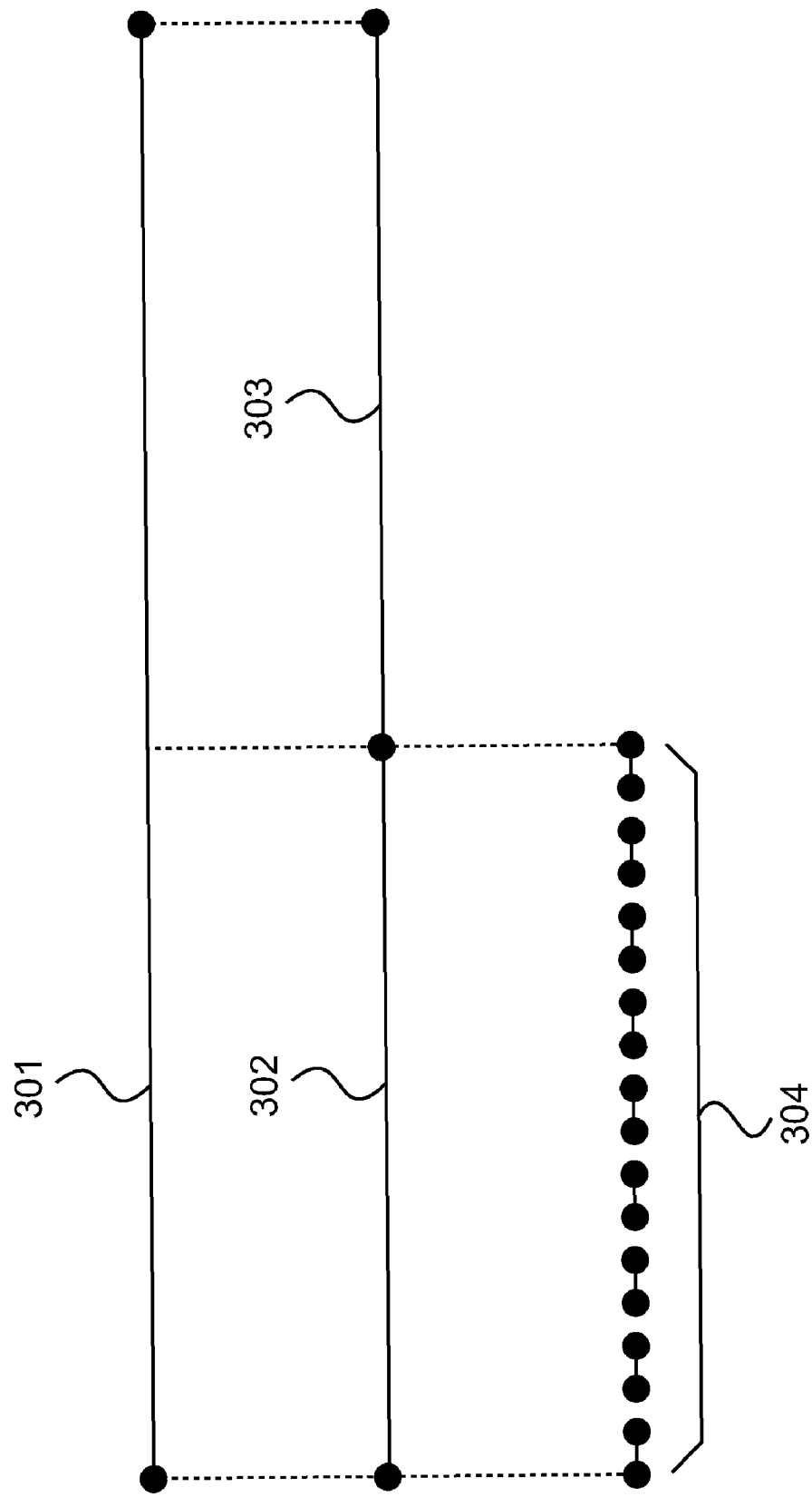
FIG. 3 offers a high level overview of the token's processor time usage.

FIG. 3 offers a high-level overview of the token's processor time usage. The token regularly (but not necessarily periodically) switches between sampling the optical signals of each optical channel and processing the sampled signals and handling other tasks such as handling the user interface. The token can therefore be considered as continuously cycling through a variable-length duty cycle (301) consisting of a sampling window (302), in which sampling values for each of the optical channels are obtained, followed by a processing period (303), in which various processing tasks are being handled including processing the received data and handling the user interface.

Each sampling window (302) is of variable length and comprises a variable number of elementary measuring time blocks (304) of approximately fixed length (typically having a length of 1 millisecond).

In each elementary measuring time block (304) the token measures the time-varying electrical signal for each optical channel. One of the five optical channels is assumed to be a dedicated clock channel. The other optical channels are assumed to be data channels. During each measuring time block (304) the token's processor thus obtains a measurement of the light intensity of the clock channel and each data channel. In one particular embodiment this measuring of the light intensity consists of counting the number of oscillator pulses of a light-sensitive hardware circuit as explained above. As long as the light intensity of the clock channel measured during the measuring time blocks (304) remains below a certain intensity threshold, the token assumes that there is no signal and adds extra measuring time blocks (304) to the sampling window. As soon as the light intensity measured in a measuring time block (304) for the clock channel exceeds said intensity threshold, the measured light intensity is stored for the clock channel and each data channel. The processor now continues to make light intensity measurements per measuring time block (304) for each channel and to store these measurements until:

either the light intensity measurement of the clock channel in a measuring time block drops below the intensity threshold (which will typically occur in the case of a CRT screen where the light intensity is characterized by very high and short spikes), or after a fixed maximum number (typically three or four) of measuring time blocks with a light intensity measurement of the clock channel exceeding the intensity threshold (which will typically be the case with an LCD screen which has a much more evenly distributed light intensity curve).

Alternatively, once the light intensity measured in a measuring time block (304) for the clock channel exceeds said intensity threshold, the processor continues to make light intensity measurements per measuring time block (304) for each channel for a fixed maximum number (typically three or four) of measuring time blocks and stores for later processing only those light intensity measurements of all channels where the measurement for the clock channel exceeds the intensity threshold.

The fixed number of measuring time blocks with a light intensity measurement of the clock channel exceeding the intensity threshold is a configurable parameter of an embodiment of the invention.

The intensity threshold is a configurable parameter of the token according to an embodiment of the invention. For proper operation of the receiving device with a wide range of displays and working conditions the value of said intensity threshold parameter is best set at such a level that:

when the device is used with a CRT display the value of the intensity threshold parameter is higher than the intensity of light received from an area of the CRT display between two consecutive passages of the Cathode Ray, which may include afterglow and reflected environmental light; and when the device is used with an LCD display the value of the intensity threshold parameter is lower than the intensity of light received from an area of the LCD display if that area is emitting the clock channel.

Determining the value of the intensity threshold parameter involves a trade-off between accommodating CRT-based systems and accommodating LCD-based systems. To accommodate as many CRT-based systems in as broad a range of working conditions as possible, the intensity threshold value should be rather high to minimize the risk that the intensity of light received from an area of the CRT display between two consecutive passages of the Cathode Ray (which may include afterglow and reflected environmental light and which has no relation with the actual signal) exceeds the threshold which could result in incorrect signal measurements, whereas the intensity threshold value should be rather low to accommodate as many LCD-based systems as possible to minimize the risk that the light received of the clock signal when the intrinsic intensity of the clock signal is at a low level would remain beneath the threshold during symbol periods where the clock signal is at its lowest level which would result in the receiving device missing some clock periods. It is an object of the invention to facilitate finding a single value for said intensity threshold parameter that satisfies the above conditions for a broad range of practical computer systems and working conditions by on the one hand having the clock channel not emitting the lowest light reference level and on the other hand choosing for the next to lowest level an intrinsic optical intensity amplitude that is sufficiently high compared to noise sources such as ambient light, so that the intensity of the clock channel will always be detectably higher than zero at every symbol period. In one embodiment said intensity threshold value is fixed at an optimum value that is empirically determined. In another embodiment the intensity threshold value is determined and updated by the receiving device in an adaptive way, e.g. by using a negative peak detector with a finite memory. In this case the intensity threshold value can for example be defined as a function of the lowest light intensity measurement detected. In yet another embodiment the intensity threshold value is initially set at an empirically determined default value from which the receiving device adapts in use.

At the end of the sampling window (302) the receiving device calculates for each optical channel (i.e. the clock channel and each data channel) a single sampling value for the entire sampling window (302) from the light intensity measurements that were made and stored for each respective channel in the different measuring time blocks (304) comprised in this sampling window (302). In one particular embodiment said single sampling value per channel is calculated as the sum of all the stored measurements for that channel. In yet another embodiment said single sampling value is simply set to the highest measurement value measured for that channel in the current sampling window.

By adding additional measurement time blocks and by not taking into account the measurements made while the measured intensity of the clock channel remains lower than the threshold, the device in essence synchronizes the effective sampling window with the light intensity spikes of a CRT display. This means that in case of a CRT display the above described method guarantees that the device will always sample the light intensity spikes and Will never produce sampling values in between two light intensity spikes. As a consequence, there is no need to average out the effect of the light intensity spikes over a symbol period, nor does the number of light intensity spikes in a symbol period need to be more or less constant. The only requirement is that in each symbol period there should be at least one spike that is effectively sampled. The double ending criterion to conclude the sampling window on the one hand guarantees that the device in the case of a LCD display will not indefinitely wait for the light intensity to subside below the threshold, while on the other hand making sure that the sampling window is concluded as soon as the light intensity spike of the CRT display has passed and that measurements that are not representative for the intrinsic intensity of the optical signal are not taken into account for further processing. The combined effect is that the single sampling value of sampling window is always representative of the intrinsic intensity of the optical signal whether it is being emitted by an LCD display or a CRT display.

Figure 4A:
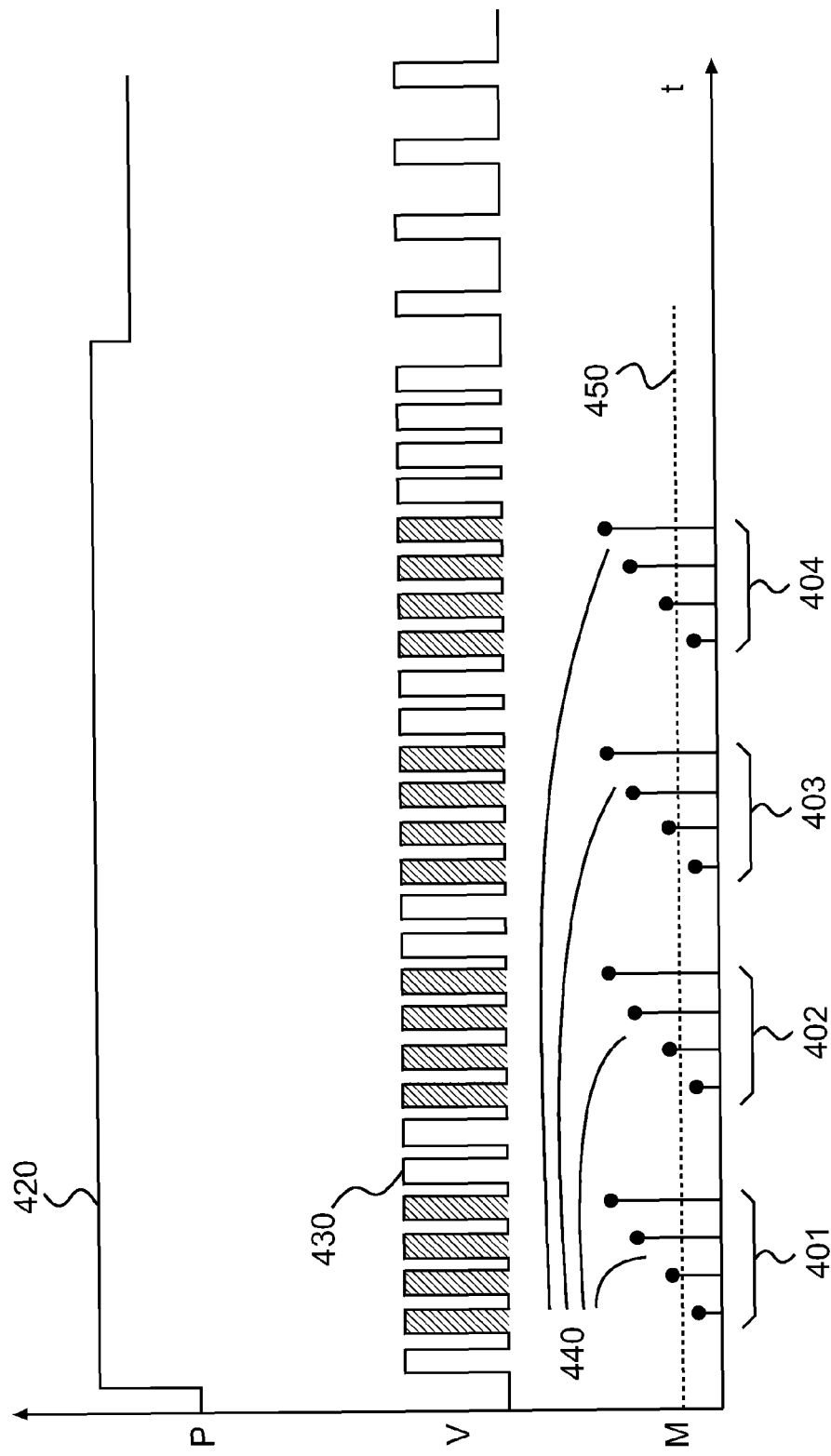
FIG. 4a illustrates a sampling method for one sampling window in case of a LCD display.

FIG. 4a illustrates the above described sampling method for one sampling window in case of an LCD display. In this diagram, line (420) represents the received light of the clock channel. The corresponding time varying signal is represented as pulse sequence (430). The measuring time blocks are represented as the time blocks (401-404). The pulse count measurements for each measuring time block (401-404) is represented by measurement sequence (440). The intensity threshold is represented as line (450). The data channels have not been illustrated in this diagram. The sampling window begins with measuring time block (401). The measurement of the clock channel of this measuring time block exceeds the threshold (450), so the receiving device stores this clock channel measurement and the measurements of the data channels (not illustrated) in the same measuring time block. Also the measurements of the clock channel of each subsequent measuring time block exceed the threshold (450) and the receiving device continues to store also the measurements of the subsequent measuring time blocks (402-404) for the clock channel and each data channel until the number of measuring time blocks with a measurement value of the clock channel exceeding the threshold reaches a certain fixed limit. In this example this limit has been set to 4. Therefore, after the 4 measuring time blocks the sampling window is finished and the receiving device calculates for the clock channel and each data channel a sampling value from the stored measurement values in measurement time blocks (401-404) of that channel.

Figure 4B:
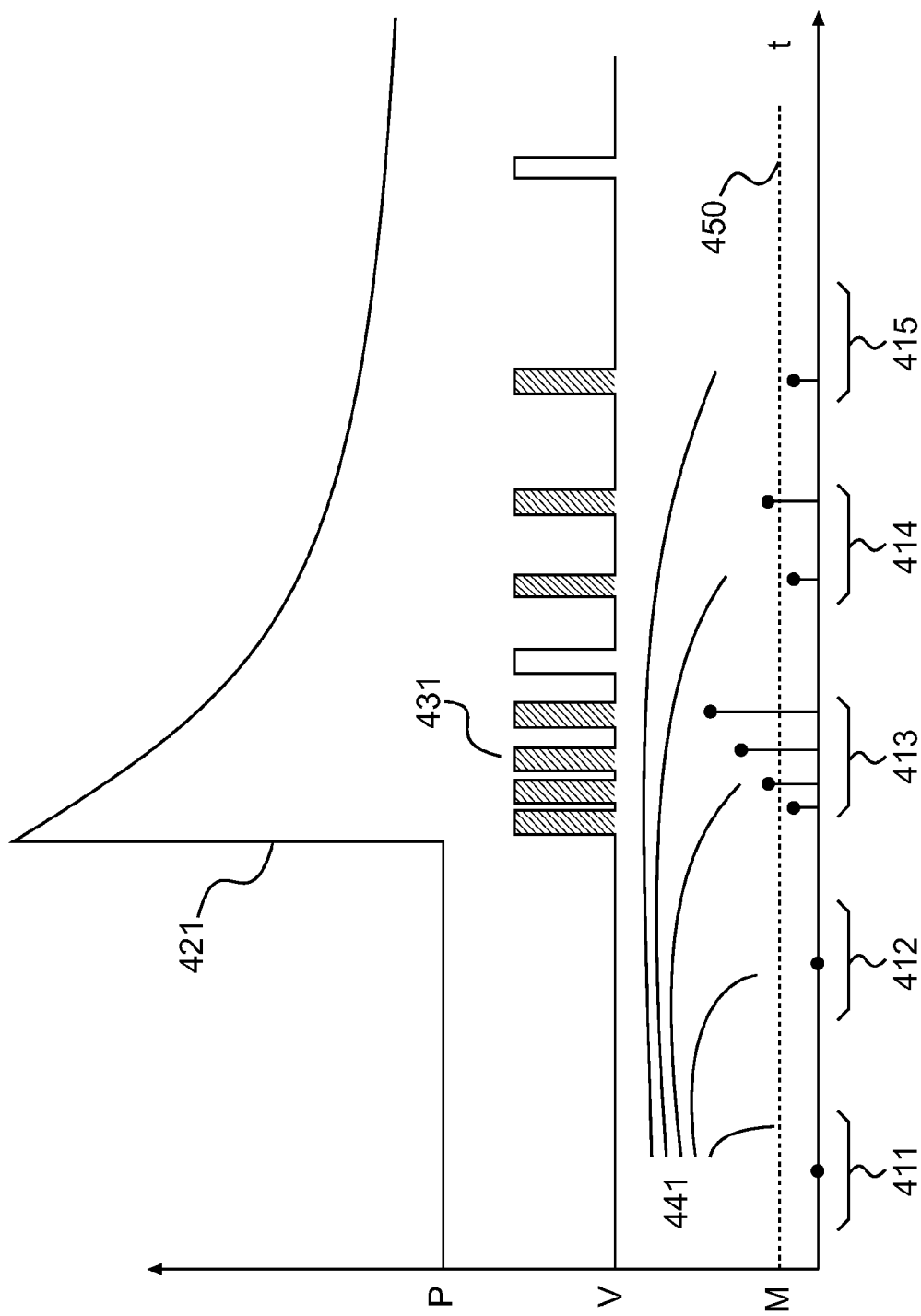
FIG. 4b illustrates a sampling method for one sampling window in case of a CRT display.

FIG. 4b illustrates the above described sampling method for one sampling window in case of a CRT display. In this diagram, line (421) represents the received light of the clock channel. The corresponding time varying signal is represented as pulse sequence (431). The measuring time blocks are represented as the time blocks (411-415). The pulse count measurements for each measuring time block (411-415) is represented by measurement sequence (441). The intensity threshold is represented as line (450). The data channels have not been illustrated in this diagram. The sampling window begins with measuring time block (411). The measurement of the clock channel of this measuring time block does not exceed the threshold (450), so the receiving device adds additional measurement time block (412) to the sampling window. Also in this additional measurement time block (412) the measurement of the clock channel doesn't exceed the threshold (450), so an additional measurement time block (413) is added to the sampling window. The measurement of the clock channel of additional measurement time block (413) exceeds the threshold (450) so the device stores this clock channel measurement and the measurements of the data channels (not illustrated) in the same measuring time block. Also the measurement of the clock channel of the subsequent measuring time block (414) exceeds the threshold (450) and the receiving device therefore also stores the measurements of the measuring time block (414) for the clock channel and each data channel. However, the measurement of the clock channel of the following measuring time block (415) no longer exceeds the threshold (450). Therefore, the receiving device concludes the sampling window and calculates for the clock channel and each data channel a sampling value from the stored measurement values of each channel in measurement time blocks (413) and (414).

Figure 5:
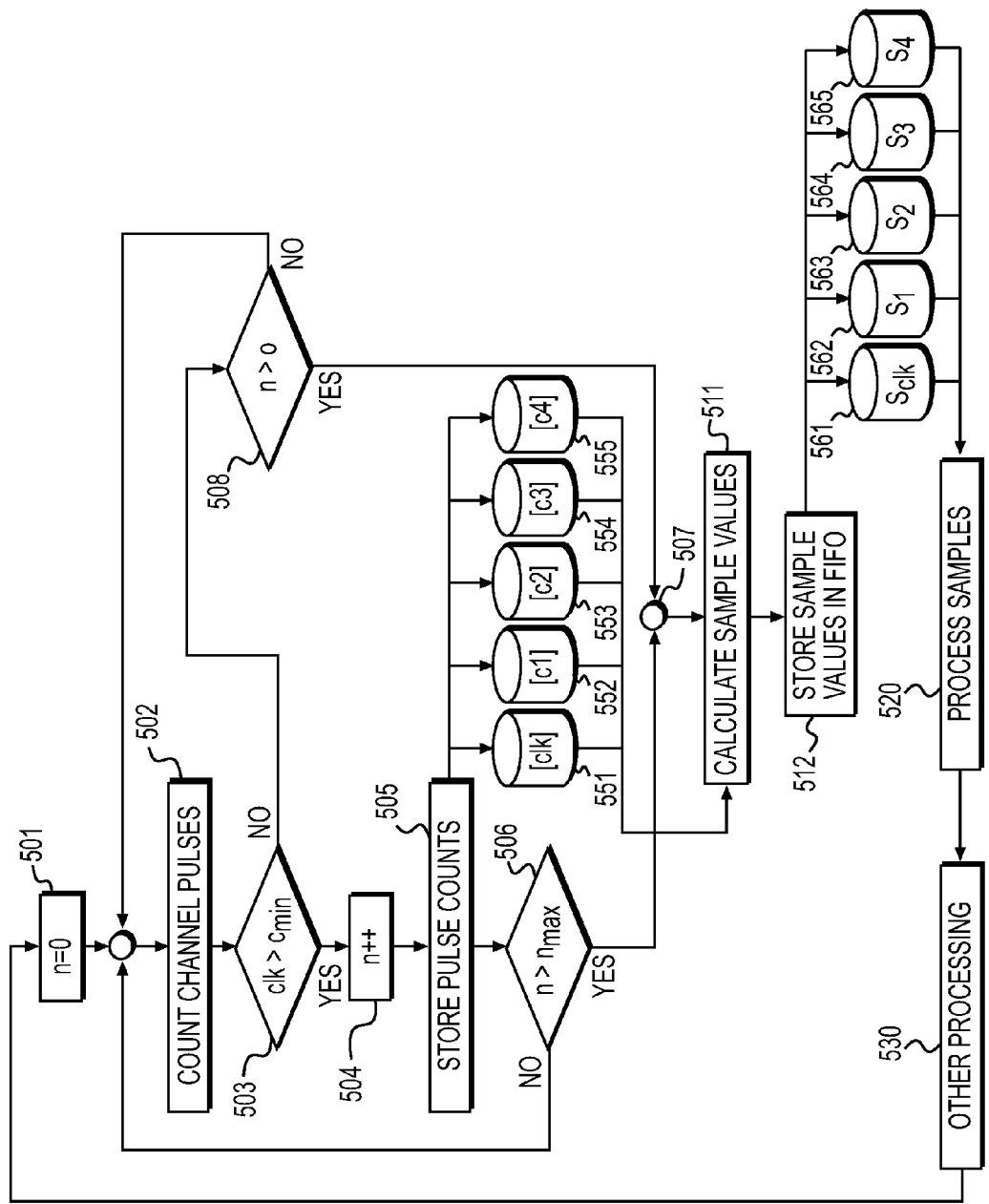
FIG. 5 illustrates with a flow diagram the actions taken by the receiving device during a sampling window.

FIG. 5 illustrates with a flow diagram the actions taken by the receiving device during a sampling window as explained above. At the beginning of the sampling window a counter n is reset (501). The counter n counts the measuring time blocks wherein the device has measured a light intensity clk of the clock channel exceeding the intensity threshold $c_{min}$. In each measuring time block the light intensity of each channel (i.e. the clock channel and each data channel) is measured e.g. by counting the pulses in a time-varying voltage (502). The device then verifies (503) whether the measured intensity of the clock channel for the current measuring time block clk exceeds the threshold $c_{min}$. If it does, the counter n is incremented (504) and the intensity measurements for each channel in the current measuring time block are stored (505) in buffers (551-555) for each channel. The device then checks (506) whether the number of measuring time blocks wherein the device has measured a light intensity clk of the clock channel exceeding the intensity threshold $c_{min}$ (as indicated by counter n) exceeds a certain maximum number $n_{max}$. If said maximum number has not yet been reached, the device adds an extra measuring time period and loops back to measuring the light intensity of the channels (502). If said maximum number has been exceeded, the device leaves the measuring loop (507) and concludes the sampling window. If comparison (503) indicates that the measured-intensity of the clock channel for the current measuring time block clk does not exceed the threshold $c_{min}$, the device checks (508) whether during the current sampling window there have been already measuring time blocks wherein the measured intensity of the clock channel clk exceeded the threshold $c_{min}$. If test (508) is negative the device adds an extra measuring time period and loops back to measuring the light intensity of the channels (502). If test (508) is positive the device leaves the measuring loop (507) and concludes the sampling window.

The receiving device maintains for each channel (i.e. the clock channel and each data channel) a First-In-First-Out (FIFO) buffer (561-565) storing the sampling values acquired in the N most recent sampling windows. The number N (which is not to be confused with counter n) of sampling values stored in the FIFO buffers (561-565) is a configurable parameter of embodiments of the invention. In a preferred embodiment N is chosen large enough to make sure that the FIFO buffers contain sampling values of enough clock periods so that all coding levels which have been used are represented. At the end of the sampling window, the device calculates (511) the sampling values for each channel using the measured values stored in the respective buffers (551-555). The calculated sampling values for each channel are added (512) to the respective FIFO buffers (561-565) and the oldest sampling values of each channel are removed from the FIFO buffers (561-565). When new sampling values in the FIFO buffers are available, the device enters a sample processing stage (520). This sample processing stage (520) is explained in more detail below in the discussion of FIGS. 6a and 6b. Then the device can take care of other processing jobs (530), and finally the device can begin a new duty cycle with a new sampling window.

Figure 6A:
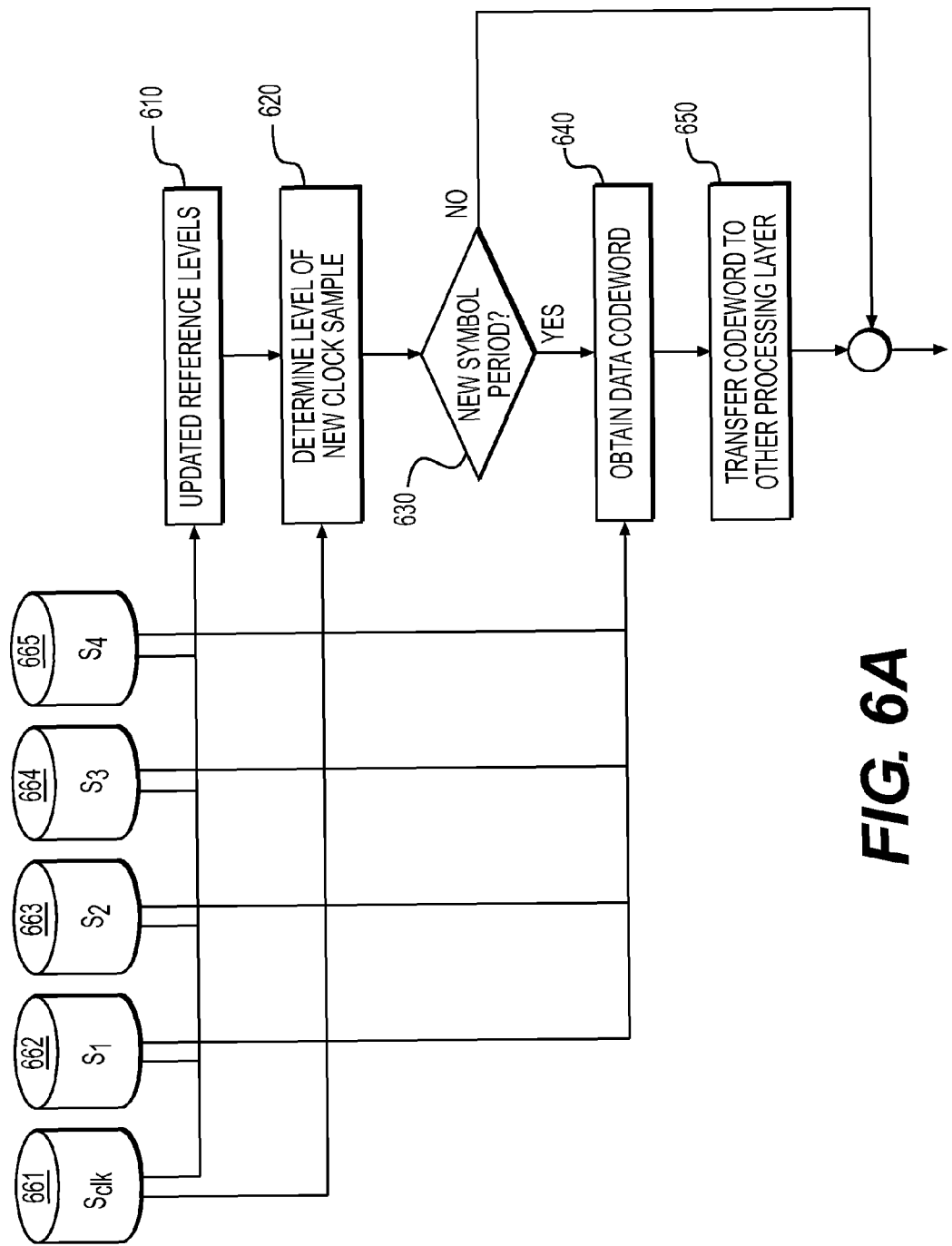
FIGS. 6a and 6b illustrate with a flow diagram the different steps of the sample processing to obtain the data code words.

FIG. 6a is a flow diagram illustrating the different steps of sample processing to obtain the data code words. In the sample processing stage the device:
updates (610) the light intensity reference levels that it assumes are used to encode the data and clock channels, said updating using the sampling values of the clock channel FIFO buffer (661) and optionally (depending on the embodiment) past sampling values of the data channels (662-665);

assigns (620) the new sampling value of the clock channel to one of the updated light intensity reference levels;

determines (630) whether a new clock period has started; and if a new clock period has started, obtain (640) the data codeword that was transmitted in the previous clock period by determining for each data channel which coding level was transmitted in the previous clock period using all the sampling values of that data channel obtained in said previous clock period and the updated reference levels; and transfers (650) the obtained data codeword to another processing layer for the encoded data to be decoded.

The device updates the assumed reference levels as follows. In a preferred embodiment the signal of the clock channel is assumed to cycle through all used coding levels except for the lowest coding level. For example, if there are three coding levels, High, Medium and Low, then the clock signal alternates between High and Medium in sequential clock periods. The device extracts the reference levels by first submitting all sampling values in the clock channel FIFO buffer to a clustering algorithm that is configured to divide the sampling values into L-1 groups where L denotes the total number of coding levels. Suitable clustering algorithms are known in the art. In one embodiment the clustering algorithm only takes into account the values of the sampling values. In another embodiment the clustering algorithm takes into account the values of the sampling values as well as the respective time of sampling or the respective order in the FIFO buffers of the different sampling values. Then the device calculates for each clustering group thus determined a reference level from the sampling values in that group. This calculation preferably involves selecting a median value, but may also alternatively or additionally involve techniques such as inter alia calculating a mean value or excluding extreme values. The reference level corresponding to the lowest coding level is estimated by means of an adaptive negative peak detector over all data channels. The peak detector can be made to be adaptive for example by taking into account only a maximum number of last samples of the data channels (e.g. only the samples in the data channel FIFO buffers mentioned above), or by having a built-in relaxation mechanism. In other embodiments there may be more than 3 coding levels and the lowest and highest coding levels are not being used in the clock channel. In one particular embodiment the lowest and highest levels are being estimated by respectively negative and positive peak detectors over all data channels.

In another embodiment the signal of the clock channel is assumed to alternate between all used coding levels. The device extracts the reference levels by submitting all sampling values in the clock channel FIFO buffer to a clustering algorithm that is configured to divide the sampling values in L groups where L denotes the total number of coding levels. For each clustering group the device calculates a reference level from the sampling values in that group.

The device delineates the clock periods as follows. Clock sampling values that are adjacent in time and whose value can be mapped to the same reference level are considered to belong to the same clock period. If two consecutive clock sampling values are mapped to a different reference level, then this transition marks a period boundary. In one embodiment mapping a clock sampling value to a reference level is done by looking at which clustering group the sampling value was assigned to when updating the reference levels. In another embodiment clock sampling values are mapped to the reference level that is nearest in value.

In other embodiments additional information and techniques may be used to delineate the clock periods. In one embodiment the clock signal cycles through the different coding levels in a fixed order. In another embodiment the length of the clock periods is constant and the processor duty cycle has a more or less constant length so that the number of sample values per clock period is also more or less constant. In yet another embodiment the length of the clock period is fixed and known to the receiving device so that the time at which the clock channel samples have been obtained is very indicative of how to group these sample values in clock periods.

Using the updated reference levels and the delineation of the clock periods, the device interprets the sampling values per clock period for each data channel and assigns one of the coding levels to each data channel for each clock period. Several methods can be used to select the appropriate coding level for a particular clock period for a particular data channel. In one embodiment a single representative value is calculated from all the sampling values of that data channel in that clock period. This calculation preferably involves selecting a median value but may alternatively or additionally also involve excluding some sampling values such as the sampling values with the highest and/or lowest values or calculating a mean value. This single representative value is then compared to the possible coding levels, and the coding level that is closest to said single representative value is selected. Different metrics can be used to determine the closest coding levels e.g. linear distance, logarithmic distance, or some other metric or distance measure. In another embodiment a coding level is assigned to each sampling value separately and the coding level that is most frequent is selected. In a particular embodiment, the sampling values of the data channels are assigned to reference levels that have been updated using the clock channel sampling values up to the same sampling moment as the sampling values of the data channels. In another particular embodiment, the reference levels have been updated using clock channel sampling values that have been obtained more recently than the data channel sampling values that are being assigned a reference level.

Figure 6B:
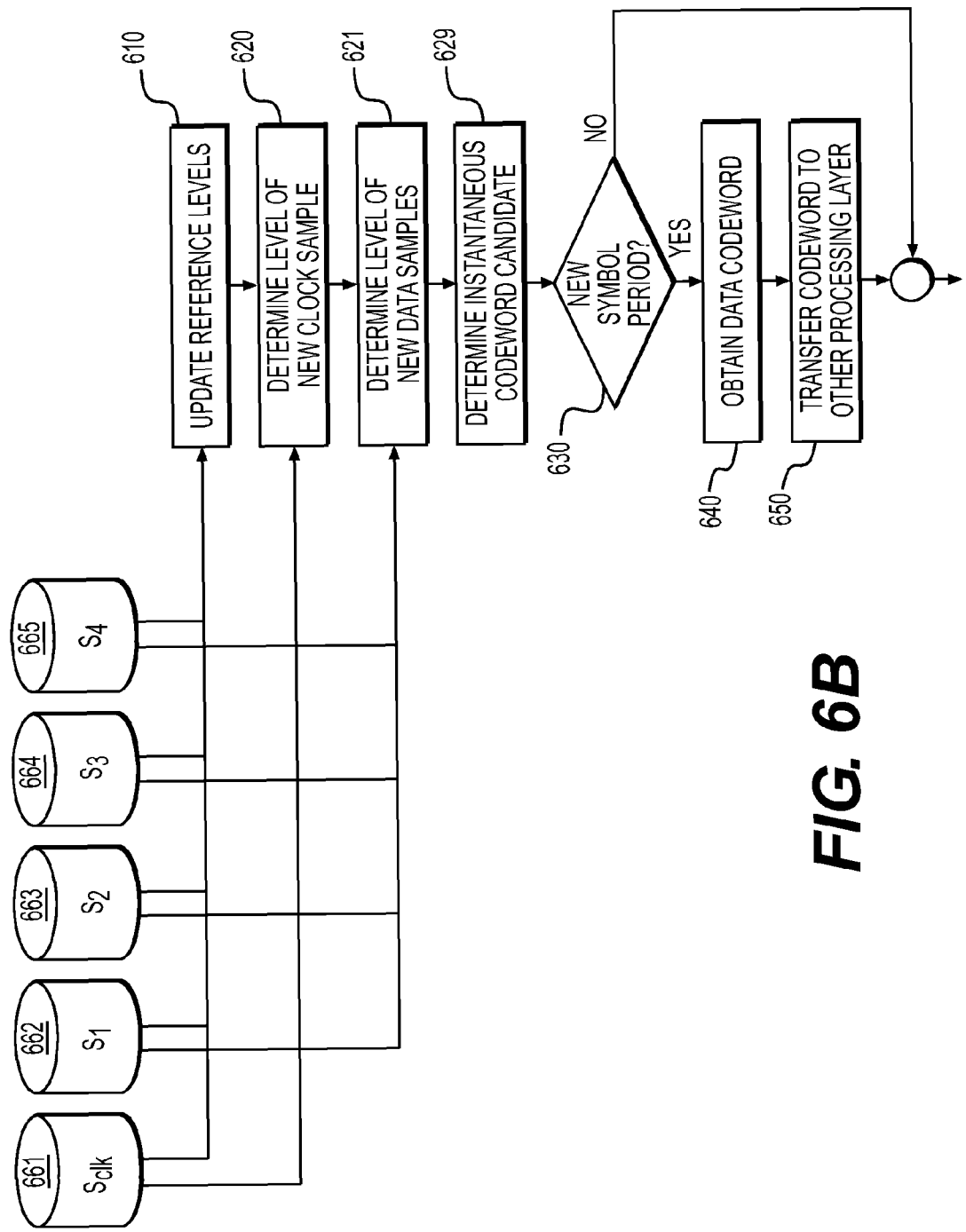

With reference to FIG. 6b, in another embodiment the device obtains the data code words as follows. In the sample processing stage the device:

updates (610) the light intensity reference levels that it assumes are used to encode the data and clock channels, said updating using the sampling values of the clock channel FIFO buffer (661) and optionally (depending on the embodiment) past sampling values of the data channels (662-665);

classifies (620) the new sampling value of the clock channel by assigning it to one of the updated light intensity reference levels;

classifies (621) each of the new sampling values of the data channels by assigning them each to one of the updated light intensity reference levels;

determines (629) from the new classified sampling values a new instantaneous extended codeword candidate ('extended' refers to the fact that the extended codeword candidate value also incorporates the classified sampling value of the clock signal);

determines (630) whether a new symbol period has started; a new symbol period has started if the last N instantaneous extended codeword candidates, or alternatively at least K of the last N (whereby K and N are both arbitrary integer values to be determined in an embodiment and whereby K would be typically larger than N/2, for example K=3 and N=4) instantaneous extended codeword candidates, have the same constant value that is different than the last data codeword value that was determined;

if a new symbol period has started, determines (640) the value of the data codeword for this new symbol period as being the constant value of the last N instantaneous extended codeword candidates or alternatively the constant value of at least K of the last N instantaneous extended codeword candidates; and transfers (650) the obtained data codeword to another processing layer for the encoded data to be decoded.

Figure 7:
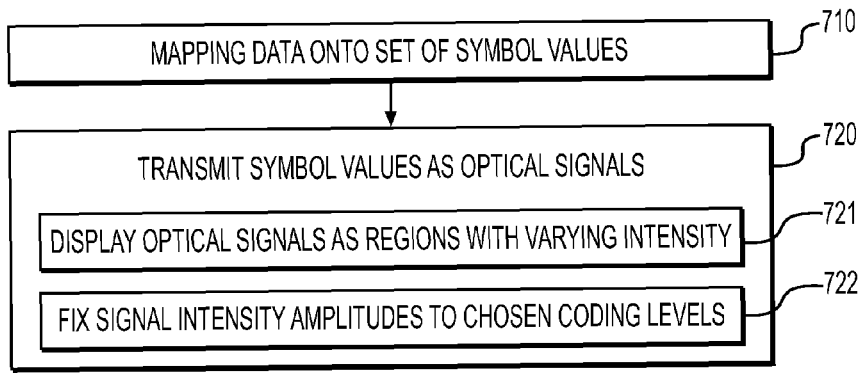
FIGS. 7 and 8 illustrate the essential steps to be performed in the method for retrieving digital data from a plurality of optical signals according to the present invention.

With reference to FIG. 7, a general embodiment of the method for modulating data onto a plurality of optical signals comprises mapping (710) said data onto sets of symbol values according to a channel coding alphabet; transmitting (720) said sets of symbol values as a plurality of optical signals by displaying (721) them as a plurality of regions with time-varying intensity; and fixing (722), in every symbol period, the intrinsic intensity amplitude of each of said plurality of optical signals to intensity levels chosen from a discrete set of coding levels in function of the symbol value being transmitted; wherein, between every two consecutive symbol periods, at least one of said plurality of optical signals transitions to a different intrinsic intensity level; and wherein, in every symbol period, the intrinsic intensity of at least one of said plurality of optical signals is set to a level that is different from the lowest intensity level of said discrete set of coding levels.

In one embodiment of the method of the present invention, at least one of said plurality of optical signals transitions to a different intrinsic intensity level between every two consecutive symbol periods.

In another embodiment of the method of the present invention, the intrinsic intensity of at least one of said plurality of optical signals is set to a level that is different from the lowest intensity level of said discrete set of coding levels in every symbol period.

In yet another embodiment of the present invention, the method further comprises using within a certain number of symbol periods starting from any symbol period all the members of a certain subset of said discrete set of coding levels in said fixing of the intrinsic intensity amplitude of said plurality of optical signals.

In a further embodiment of the present invention, the method further comprises using one of said plurality of optical signals as a clock signal which is in phase with the optical signals used to transmit the data and which cycles through all coding levels used by said data signals except for the coding level having the lowest light intensity and which transitions to a different intrinsic intensity level at the conclusion of every symbol period.

In still a further embodiment of the method of the present invention, said transmitting comprises displaying time-varying intensity levels on a cathode-ray tube display.

In another embodiment of the method of the present invention, said transmitting comprises displaying time-varying intensity levels on a liquid-crystal display.

A general embodiment of the method for retrieving digital data from a plurality of optical signals comprises obtaining representative sampling values of said optical signals; and causing the sampling moments of said optical signals to coincide with the moments of peak emission in case said optical signals are emitted by a display using CRT technology.

In one embodiment of the present invention, the method further comprises making sets of substantially concurrent instantaneous optical signal intensity measurements of said optical signals comprising at least one measurement for each of said optical signals; choosing an appropriate threshold value; and selecting those of said sets of substantially concurrent instantaneous intensity measurements where the instantaneous intensity measurement of at least one of said optical signals exceeds said threshold value.

In one particular embodiment of the present invention, the method further comprises dividing for each optical signal said selected instantaneous intensity measurements into groups; making sure in case said optical signals are emitted by a display using CRT technology that measurements taken during the same CRT intensity spike are grouped together; and calculating for each group from the measurements in said group a sampling value that is representative for the intrinsic optical intensity amplitude of said optical signal.

In one more particular embodiment of the present invention, the method further comprises dividing said representative sampling values into symbols, each boundary of which being derived from a transition in the intrinsic optical intensity amplitude between consecutive representative sampling values of at least one of said optical signals.

In another embodiment of the method of the present invention, the method further comprises comparing said representative sampling values to intensity reference levels; and determining or updating at least some of said intensity reference levels in an adaptive way.

In one particular embodiment of the present invention, the method further comprises using a clustering algorithm in said adaptive determining or updating of intensity reference levels.

In another particular embodiment of the present invention, the method further comprises determining some of said intensity reference levels by interpolating intensity reference levels that have already been determined.

In yet another particular embodiment of the present invention, the method further comprises adaptively determining the intensity reference levels for the lowest and/or highest coding levels used in the optical signals by using a dynamic peak detection method in which the current reference levels for said lowest and/or highest coding levels are with time gradually relaxed to a less extreme value until a representative sampling value occurs which is lower respectively higher than said current reference levels, at which time said representative sampling value is used to update said current reference levels.

Figure 8:
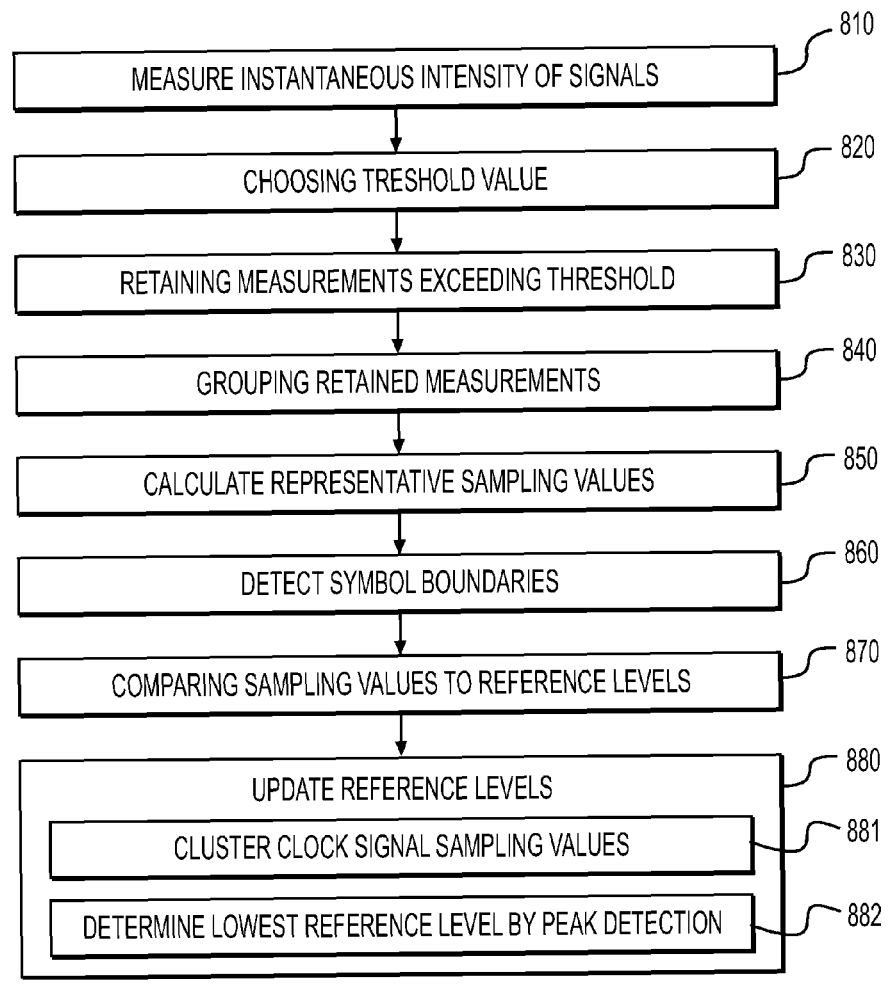

With reference to FIG. 8, in yet another embodiment of the present invention, the method further comprises treating at least one of said optical signals as a clock signal; making (810) sets of substantially concurrent instantaneous optical signal intensity measurements of said optical signals comprising at least one measurement for each of said optical signals; choosing (820) an appropriate threshold value; selecting (830) those of said sets of substantially concurrent instantaneous intensity measurements where the instantaneous intensity measurement of at said clock signal exceeds said threshold value; dividing (840) for each optical signal said selected instantaneous intensity measurements into groups; making sure in case said optical signals are emitted by a display using CRT technology that measurements taken during the same. CRT intensity spike are grouped together; calculating (850) for each group from the measurements in said group a sampling value that is representative for the intrinsic optical intensity amplitude of said optical signal; dividing (860) said representative sampling values into symbols, each boundary of which being derived from a transition in the intrinsic optical intensity amplitude between consecutive representative sampling values of said clock signal, and comparing (870) said representative sampling values to intensity reference levels to assign symbol values; determining or updating (880) at least some of said intensity reference levels in an adaptive way by clustering (881) at least some of the representative sampling values of said clock signal; and adaptively determining the intensity reference level for the lowest coding level used in the optical signals by using (882) a dynamic peak detection method in which the current reference level for said lowest coding level is gradually relaxed with time to a higher value until a representative sampling value occurs which is lower than said current reference level, at which time said representative sampling value is used to update said current reference level.

Figure 9:
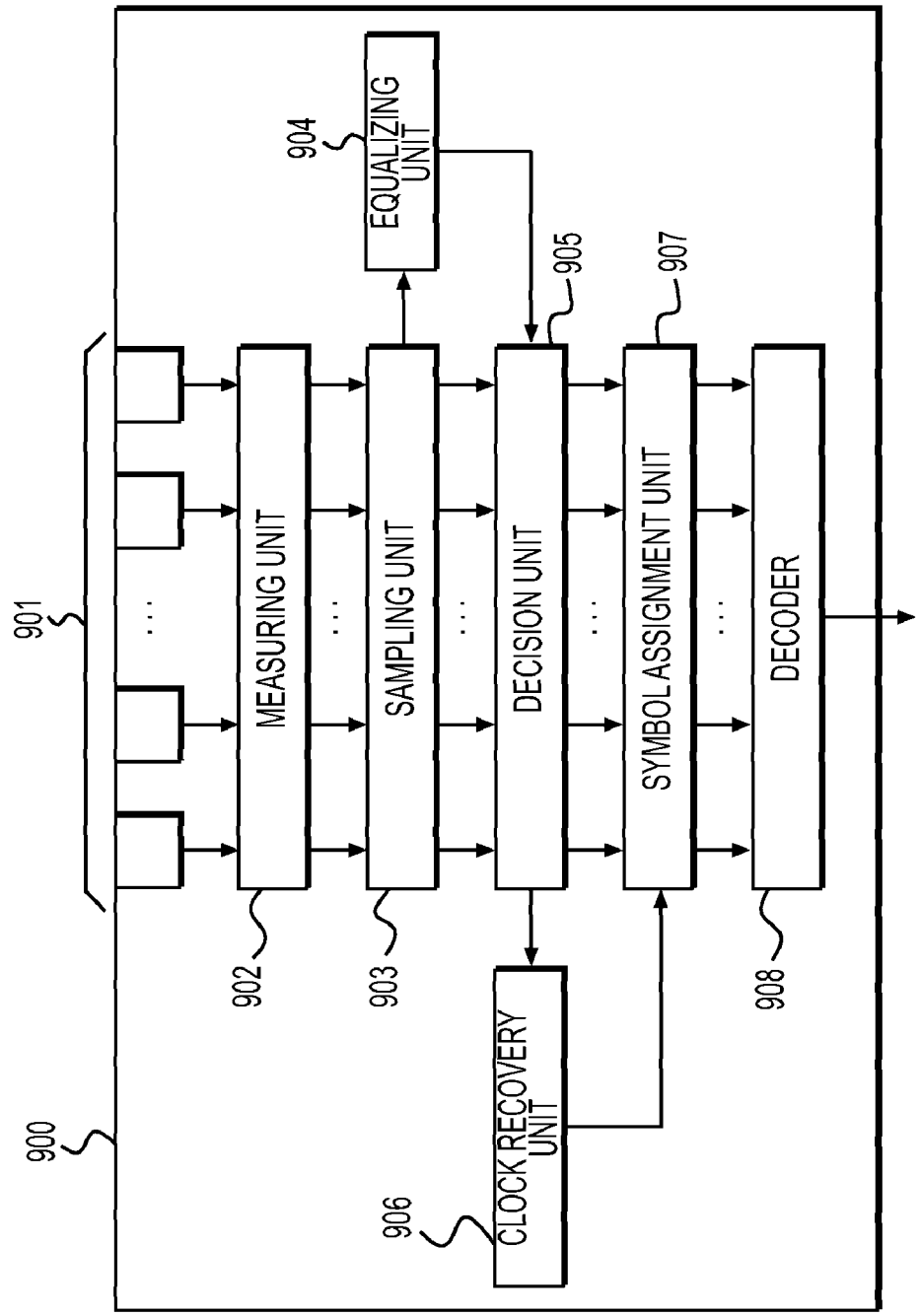
FIG. 9 illustrates the structure of an apparatus for receiving digital data modulated in a plurality of optical signals according to the present invention.

With reference to FIG. 9, a general embodiment of the apparatus (900) for receiving digital data modulated in a plurality of optical signals comprises a plurality of circuits (901) adapted to convert each of said plurality of optical signals into an electrical signal pulsating at a frequency which is a function of the instantaneous intensity of the corresponding optical signal; a measuring unit (902) adapted to take a set of intensity measurements of each of said electrical signals in a plurality of sampling windows; a sampling unit (903) adapted to calculate for each of said electrical signals in each of said plurality of sampling windows a representative sampling value from the corresponding set of intensity measurements; an equalizing unit (904) adapted to calculate from a subset of said representative sampling values estimates for the boundaries of a finite set of discrete intensity levels; a decision unit (905) adapted to select for each of said electrical signals in each of said plurality of sampling windows an intensity level from said finite set of discrete intensity levels, by comparing the corresponding representative sampling value to said boundary estimates; a symbol clock recovery unit (906) adapted to detect transitions in the intensity levels between consecutive sampling windows in at least one of said electrical signals; a symbol assignment unit (907) adapted to calculate symbol values for every symbol clock period from intensity levels associated with sampling windows comprised in said symbol clock period; and a decoder (908) adapted to decode said symbol values as said digital data according to a channel coding alphabet.

In a preferred embodiment, measuring unit (902), sampling unit (903), equalizing unit (904), decision unit (905), symbol clock recovery unit (906), symbol assignment unit (907) and decoder (908) are implemented using one or more general purpose or specialized microprocessors programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

In one embodiment circuits (901) comprise circuits as illustrated by FIG. 2*a*. In another embodiment circuits (901) comprise circuits as illustrated by FIG. 2*b*.

In one embodiment of the apparatus of the present invention, at least one of said plurality of circuits comprises a photodiode.

In another embodiment of the apparatus of the present invention, at least one of said plurality of circuits comprises a phototransistor.

In yet another embodiment of the present invention, the apparatus further comprises a synchronization unit adapted to compare intensity measurements associated with at least one of said electrical signals and a sampling window to a discard threshold, and, if said intensity measurements are below said discard threshold, to discard said intensity measurements of said at least one of said electrical signals and corresponding intensity measurements associated to other electrical signals; and to extend said sampling window with extra intensity measurements accordingly.

In one particular embodiment of the apparatus of the present invention, said discard threshold is set at an appropriate value to effectively discard intensity measurements taken outside a periodical luminance spike of a cathode ray tube display. In another particular embodiment of the apparatus of the present invention, said discard threshold is determined and updated in an adaptive way.

In a further embodiment of the apparatus of the present invention, said sampling unit is adapted to add intensity measurements from said set of intensity measurements.

In still a further embodiment of the apparatus of the present invention, said equalizing unit calculates the boundaries of at least the lowest or highest level of said finite set of discrete intensity levels by increasing respectively decreasing the boundaries of said lowest respectively highest level with time until a representative sampling value below respectively above the then current lowest respectively highest of said reference intensity levels occurs, at which time said boundaries of said lowest or highest level of said finite set of discrete intensity levels are set in function of said representative sampling value.

In another embodiment of the apparatus of the present invention, said equalizing unit is adapted to apply a clustering algorithm to said representative sampling values.

In another embodiment of the apparatus of the present invention, said symbol clock recovery unit relies on transitions occurring between sampling windows in the intensity level of at least one of said plurality of electrical signals. In one particular embodiment of the apparatus of the present invention, said symbol clock recovery unit relies on transitions occurring between sampling windows in the intensity level of a single one of said electrical signals.

In another embodiment of the apparatus of the present invention, one or more of said measuring unit, said sampling unit, said equalizing unit, said decision unit, said symbol clock recovery unit, said symbol assignment unit, and said decoder are implemented in a single electronic component. In one particular embodiment of the apparatus of the present invention, said single electronic component comprises a microprocessor.

Figure 10:
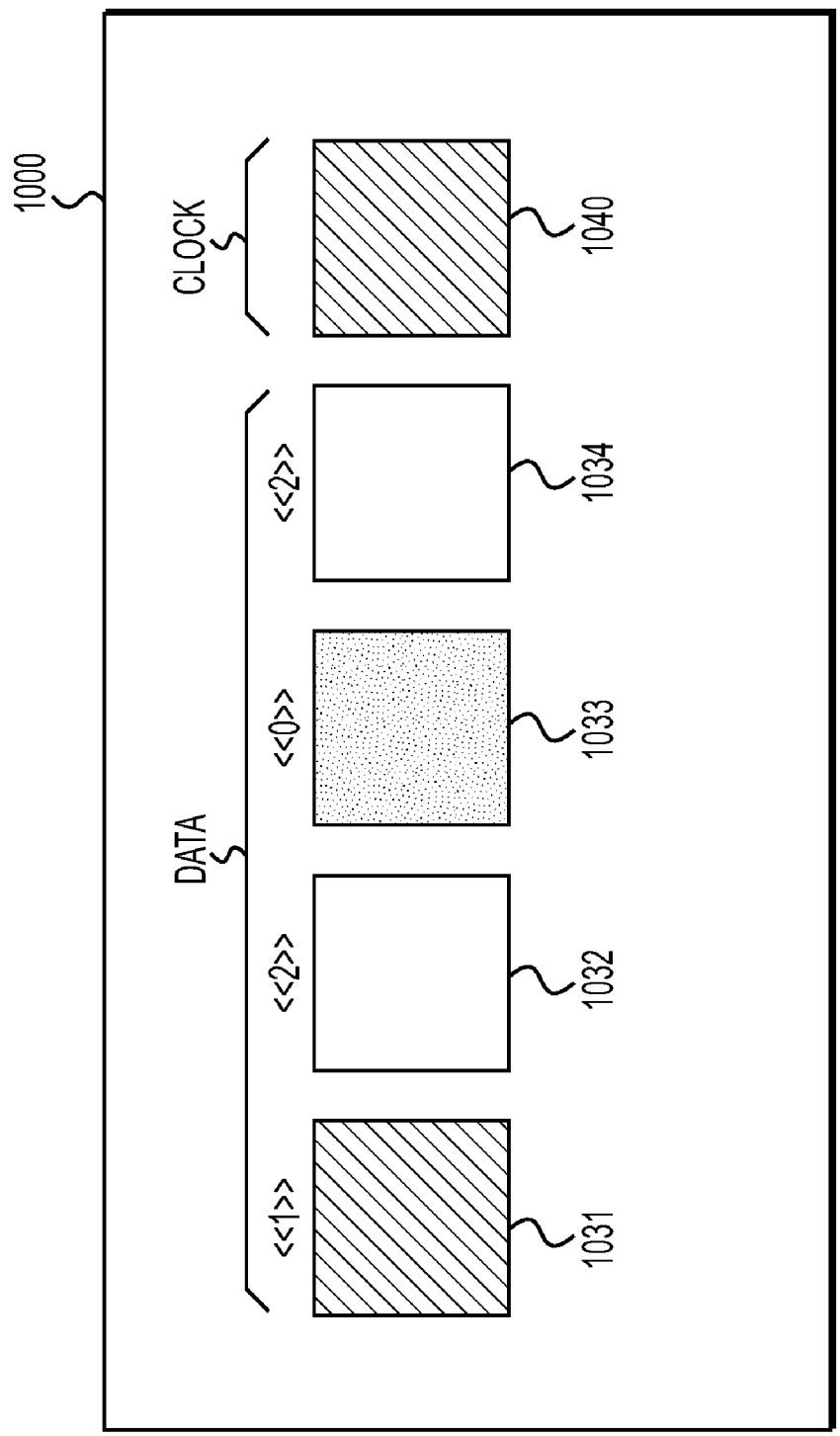
FIG. 10 gives a snapshot of a display emitting a plurality of optical signals according to an embodiment of the present invention.

With reference to FIGS. 10 and 11, in a preferred embodiment, the data to be sent to the receiving device consists of a string of bits (1100). To send this binary string to a receiving device, the binary string is first transformed into a sequence (1110) of ordered groups of 6 bits. Each ordered group of six bits is then transformed into an ordered group of 4 ternary digits i.e. each ordered group of six bits is interpreted as the binary representation of a number and this binary representation is replaced by the corresponding base-3 representation, to obtain a sequence (1120) of symbols, each symbol being an ordered group of 4 ternary digits. In a more particular embodiment extra symbols or special symbol values may be added for example to act as a start sequence. Then each symbol is emitted by the display (1000) in turn and in order that they appear in the sequence of symbols as follows:

According to some rule, each of the 4 ternary digits of the symbol is allocated to one of four specific regions (1031-1034) of the display that are dedicated to emitting data signals. For example: the most significant digit is allocated to the left most region (1031), the next most significant digit is allocated to the next left most region (1032), the least significant digit is allocated to the right most region (1034) and the next least significant digit is allocated to the next right most region (1033).

For each data region (1031-1034) an intrinsic intensity level is selected on the basis of the ternary value of the ternary digit allocated to that region. This intensity level is selected from a set of three different intensity levels which can be labelled as High (white), Medium (grey) and Low (black). For example the High intensity level (white) is selected in case of the highest ternary value ("2"), the Low intensity level (black) is selected for the lowest ternary value ("0"), the Medium intensity level (grey) is selected for the middle ternary value ("1").

The four data regions (1031-1034) emit light with :the respective selected intensities for a fixed time which is at least as long as two refresh cycles of the display.

Then, the next group of 4 ternary digits is emitted.

In this way the four data regions (1031-1034) emit in parallel four time-varying optical data signals (1131-1134) carrying the data for a receiving device to receive and whose intrinsic intensity is determined at every symbol period by the respective ternary digits of that symbol period they are coding, as is depicted in FIG. 11.

A fifth region (1040) of the display (1000) is used for a clock signal (1140) that is emitted synchronously with the data signals (1131-1134) of the four data regions (1031-1034). The intrinsic intensity level of this clock region (1040) toggles between the High (white) and Medium (grey) level, as is also depicted in FIG. 11.

Those skilled in the art will appreciate that a variety of devices may be used to implement the procedures described in connection with FIGS. 10 and 11. In a preferred embodiment a common personal computer (PC) is used. Many processors are quite capable of receiving a digital string such as the string (1100) and driving either a CRT or LCD display to product the optical presentation of FIGS. 10 and 11.

A preferred embodiment of the receiving device is illustrated in FIG. 1. To receive the data optically transmitted as described above, the user holds the receiving device close to the display and positions: it such that each of the optically sensitive components (101-105) is in front of one of the signal emitting regions (1031-1034 and 1040) of the display so that each optically sensitive component of the receiving device can capture the light of one of the optical signals (1131-1134 and 1140). To receive the transmitted data the device continuously repeats a cycle which consists of a sampling window followed by a processing period. At the start of the sampling window the receiving device regularly measures the instantaneous intensity of the light received by each of the five optically sensitive components (101-105). The receiving device has a threshold parameter which has been chosen such that on the one hand the value of an instantaneous intensity measurement of the 'grey' and 'white' level on an LCD display or during a spike on a CRT display will be higher than this threshold, while on the other hand the value of an instantaneous intensity measurement taken when no signal is emitted taken in between two spikes on a CRT display will be lower than this threshold. Because the intrinsic intensity of the clock signal (1140) is assumed to be always different from zero (it is either 'white' or 'grey'), the value of an instantaneous intensity measurement of the clock channel will be below the threshold only if either no signal is being received (for example because the device is not well positioned or because no signal is being emitted by the display) or if the display is a CRT display and the measurement takes place in between two spikes. The receiving device therefore keeps making measurements of the instantaneous intensity of the clock signal until the measurement value exceeds the threshold. When the measured instantaneous intensity of the clock signal (1140) exceeds the threshold, it is assumed that there is a signal being emitted and that either the measurement is being done with a LCD display or with a CRT display just at the time of a CRT spike. The device now also measures the instantaneous intensity of the data signals (1131-1134) and stores the measured values of the clock and data signals. The receiving device continues measuring the instantaneous intensities of the clock and data signals until the instantaneous intensity measurement of the clock signal is below the threshold again (i.e. the CRT spike has passed) or until it has obtained and stored three measurements for each of the clock and data signals (e.g. in the case of an LCD display). Now the receiving device calculates for each signal from the stored measurements of the instantaneous intensity of that signal an estimate of the intrinsic intensity of that signal e.g. by simple averaging. These calculated estimates for each signal are then stored in a first-in-first-out (FIFO) buffer. All the estimates (the latest estimate as well as estimates obtained in previous cycles) of the clock signal that are stored in the FIFO buffer are now used to update the reference levels for the 'grey' and 'white' levels. This is done using a simple clustering algorithm that divides the stored estimates of the clock signal in two groups. For each of both groups a reference level is calculated e.g. by simple averaging. The device also updates a reference level for the 'black' level using the estimates of the data signals in the FIFO buffer, e.g. by simply selecting the estimate with the lowest value. Using the updated reference levels for the 'grey' and 'white' levels, the receiving device now assigns a level to the latest estimate of the clock signal stored in the FIFO buffer. As all estimates of the clock signal stored in the FIFO buffer have now been assigned a level, the device can distinguish the clock periods in the stored measurements of the signals. I.e. consecutive estimates of the clock signal that have been assigned the same level are assumed to belong to the same clock period. If the latest estimate appears to belong to a new clock period compared to the previous estimate, the device calculates for each data signal a sample value from all estimates of that data signal belonging to the previous clock period e.g. by simply averaging these estimates. Using the updated reference levels for the 'black', 'grey' and 'white' levels the device assigns a level to each of these data signal sample values, it converts the assigned levels to the corresponding ternary digit values (i.e. 'white' into '2', 'grey' into '1' and 'black' into '0') and passes the obtained symbol (consisting of the ordered group of 4 ternary digits) to another processing layer for further processing. This concludes the sampling window whereafter the device's processor starts a processing period in which it handles some other processing tasks such as handling the user interface, after which the device begins another cycle consisting of a sampling window followed by a processing period.

While various embodiments of the present invention have been described above, it should be understood that they have been presented by way of example only, and not limitation. Thus, the breadth and scope of the present invention should not be limited by any of the above described exemplary embodiments but should be defined only in accordance with the following claims and their equivalents.

The invention claimed is:

1. A method for modulating data onto a plurality of optical signals, comprising:
mapping said data onto sets of symbol values according to a channel coding alphabet;
transmitting said sets of symbol values as a plurality of optical signals by displaying them as a plurality of regions with time-varying intensity for a pre-determined symbol period with the intrinsic intensity amplitude of each of said plurality of optical signals set to intensity levels chosen from a discrete set of coding levels as a function of the symbol value being transmitted;

said intrinsic intensity amplitudes selected so that between any two consecutive symbol periods at least one of said plurality of optical signals transitions to a different intrinsic intensity level and so that in every symbol period the intrinsic intensity of at least one of said plurality of optical signals is set to a level that is different from the lowest intensity level of said discrete set of coding levels.

2. The method of claim 1, said intrinsic intensity amplitudes selected so that at least one of said plurality of optical signals transitions to a different intrinsic intensity level between every two consecutive symbol periods.

3. The method of claim 1, wherein said intrinsic intensity amplitudes are selected so that for a given one of said optical signals the intrinsic intensity in every symbol period is set to a level that is different from the lowest intensity level of said discrete set of coding levels.

4. The method of claim 1, further comprising:
selecting said intrinsic intensity amplitudes so that within a pre-determined number of symbol periods starting from any symbol period all the members of a certain subset of said discrete set of coding levels are used in the intrinsic intensity amplitudes of said plurality of optical signals.

5. The method of claim 1, further comprising:
using one of said plurality of optical signals as a clock signal which is in phase with the optical signals used to transmit the data and which cycles through all coding levels used by said data signals except for the coding level having the lowest light intensity and which transitions to a different intrinsic intensity level between every two consecutive symbol periods.

6. The method of claim 1, wherein said transmitting comprises displaying time-varying intensity levels on a cathode-ray tube display.

7. The method of claim 1, wherein said transmitting comprises displaying time-varying intensity levels on a liquid-crystal display.

8. A method of for retrieving digital data from a plurality of optical signals emitted from a display using CRT technology, said method comprising:
obtaining, by a processor, representative sampling values of said optical signals;
setting, by the processor, a sampling moment of said optical signals to coincide with moments of peak emission of said optical signals;
making, by the processor, sets of substantially concurrent instantaneous optical signal intensity measurements of said optical signals comprising at least one measurement for each of said optical signals;
choosing, by the processor, an appropriate threshold value; and
selecting, by the processor, those of said sets of substantially concurrent instantaneous intensity measurements where the instantaneous intensity measurement of at least one of said optical signals exceeds said threshold value.

9. The method of claim 8, further comprising:
dividing for each optical signal said selected instantaneous intensity measurements into groups;
making sure in case said optical signals are emitted by a display using CRT technology that measurements taken during the same CRT intensity spike are grouped together; and
calculating for each group from the measurements in said group a sampling value that is representative for the intrinsic optical intensity amplitude of said optical signal.

10. The method of claim 9, further comprising:
dividing said representative sampling values into symbols, each boundary of which being derived from a transition in the intrinsic optical intensity amplitude between consecutive representative sampling values of at least one of said optical signals.

11. The method of claim 8, further comprising:
comparing said representative sampling values to intensity reference levels; and
determining or updating at least some of said intensity reference levels in an adaptive way.

12. The method of claim 11, further comprising:
using a clustering algorithm in said adaptive determining or updating of intensity reference levels.

13. The method of claim 11, further comprising:
determining some of said intensity reference levels by interpolating intensity reference levels that have already been determined.

14. A method of for retrieving digital data from a plurality of optical signals emitted from a display using CRT technology, said method comprising:
obtaining, by a processor, representative sampling values of said optical signals;
setting, by the processor, a sampling moment of said optical signals to coincide with moments of peak emission of said optical signals;
comparing, by the processor, said representative sampling values to intensity reference levels;
determining, by the processor, or updating at least some of said intensity reference levels in an adaptive way;
adaptively determining, by the processor, the intensity reference levels for the lowest and/or highest coding levels used in the optical signals by using a dynamic peak detection method in which the current reference levels for said lowest and/or highest coding levels are with time gradually relaxed to a less extreme value until a representative sampling value occurs which is lower respectively higher than said current reference levels, at which time said representative sampling value is used to update said current reference levels.

15. A method of for retrieving digital data from a plurality of optical signals emitted from a display using CRT technology, said method comprising:
obtaining, by the processor, representative sampling values of said optical signals;
setting, by the processor, a sampling moment of said optical signals to coincide with moments of peak emission of said optical signals;
treating, by the processor, at least one of said optical signals as a clock signal;
making, by the processor, sets of substantially concurrent instantaneous optical signal intensity measurements of said optical signals comprising at least one measurement for each of said optical signals;
choosing, by the processor, an appropriate threshold value;
selecting, by the processor, those of said sets of substantially concurrent instantaneous intensity measurements where the instantaneous intensity measurement of at said clock signal exceeds said threshold value;
dividing, by the processor, for each optical signal said selected instantaneous intensity measurements into groups;

making sure, by the processor, in case said optical signals are emitted by a display using CRT technology that measurements taken during the same CRT intensity spike are grouped together;

calculating, by the processor, for each group from the measurements in said group a sampling value that is representative for the intrinsic optical intensity amplitude of said optical signal;

dividing, by the processor, said representative sampling values into symbols, each boundary of which being derived from a transition in the intrinsic optical intensity amplitude between consecutive representative sampling values of said clock signal, and comparing said representative sampling values to intensity reference levels;

determining or updating, by the processor, at least some of said intensity reference levels in an adaptive way by clustering at least some of the representative sampling values of said clock signal; and adaptively determining, by the processor, the intensity reference level for the lowest coding level used in the optical signals by using a dynamic peak detection method in which the current reference level for said lowest coding level is gradually relaxed with time to a higher value until a representative sampling value occurs which is lower than said current reference level, at which time said representative sampling value is used to update said current reference level.

16. An apparatus for receiving digital data modulated in a plurality of optical signals, comprising:

a plurality of circuits each adapted to convert one of said plurality of optical signals into an electrical signal pulsating at a frequency which is a function of the instantaneous intensity of the corresponding optical signal;

a measuring unit adapted to take a set of intensity measurements of each of said electrical signals in a plurality of sampling windows;

a sampling unit adapted to calculate for each of said electrical signals in each of said plurality of sampling windows a representative sampling value from the corresponding set of intensity measurements;

an equalizing unit adapted to calculate from a subset of said representative sampling values estimates for the boundaries of a finite set of discrete intensity levels;

a decision unit adapted to select for each of said electrical signals in each of said plurality of sampling windows an intensity level from said finite set of discrete intensity levels, by comparing the corresponding representative sampling value to said boundary estimates;

a symbol clock recovery unit adapted to detect transitions in the intensity levels between consecutive sampling windows in at least one of said electrical signals;

a symbol assignment unit adapted to calculate symbol values for every symbol clock period from intensity levels associated With sampling windows comprised in said symbol clock period; and a decoder adapted to decode said symbol values as said digital data according to a channel coding alphabet.

17. The apparatus of claim 16, wherein at least one of said plurality of circuits comprises a photodiode.

18. The apparatus of claim 16, wherein at least one of said plurality of circuits comprises a phototransistor.

19. The apparatus of claim 16, further comprising:

a synchronization unit adapted to compare intensity measurements associated with at least one of said electrical signals and a sampling window to a discard threshold, and, if said intensity measurements are below said discard threshold, to discard said intensity measurements of said at least one of said electrical signals and corresponding intensity measurements associated to other electrical signals; and to extend said sampling window with extra intensity measurements accordingly.

20. The apparatus of claim 19, wherein said discard threshold is set at an appropriate value to effectively discard intensity measurements taken outside the periodical luminance spike of a cathode ray tube display.

21. The apparatus of claim 19, wherein said discard threshold is determined and updated in an adaptive way.

22. The apparatus of claim 16, wherein said sampling unit is adapted to perform an addition of intensity measurements from said set of intensity measurements.

23. The apparatus of claim 16, wherein said equalizing unit calculates the boundaries of at least the lowest or highest level of said finite set of discrete intensity levels by increasing respectively decreasing the boundaries of said lowest respectively highest level with time until a representative sampling value below respectively above the then-current lowest respectively highest of said reference intensity levels occurs, at which time said boundaries of said lowest or highest level of said finite set of discrete intensity levels are set in function of said representative sampling value.

24. The apparatus of claim 16, wherein said equalizing unit is adapted to apply a clustering algorithm to said representative sampling values.

25. The apparatus of claim 16, wherein said symbol clock recovery unit relies on transitions occurring between sampling windows in the intensity level of at least one of said plurality of electrical signals.

26. The apparatus of claim 25, wherein said symbol clock recovery unit relies on transitions occurring between sampling windows in the intensity level of a single one of said electrical signals.

27. The apparatus of claim 16, wherein one or more of said measuring unit, said sampling unit, said equalizing unit, said decision unit, said symbol clock recovery unit, said symbol assignment unit, and said decoder are implemented in a single electronic component.

28. The apparatus of claim 27, wherein said single electronic component is a microprocessor.

* * * * *